(12) United States Patent
Mesher et al.

(10) Patent No.: US 9,096,788 B2
(45) Date of Patent: Aug. 4, 2015

(54) BREAKERS FOR GELLED FRACTURING FLUIDS

(71) Applicant: GasFrac Energy Services Inc., Calgary (CA)

(72) Inventors: Shaun T. Mesher, Calgary (CA); Gabrielle L. H. Robson, London (GB)

(73) Assignee: GasFrac Energy Services Inc., Calgary (CA)

(*) Notice: Subject to any disclaimer, the term of this patent is extended or adjusted under 35 U.S.C. 154(b) by 144 days.

(21) Appl. No.: 13/925,739

(22) Filed: Jun. 24, 2013

(65) Prior Publication Data

US 2013/0338048 A1  Dec. 19, 2013

Related U.S. Application Data

(62) Division of application No. 12/609,893, filed on Oct. 30, 2009, now abandoned.

(51) Int. Cl.
| | |
|---|---|
| *C09K 8/74* | (2006.01) |
| *C09K 8/04* | (2006.01) |
| *C09K 8/68* | (2006.01) |
| *C09K 8/504* | (2006.01) |
| *E21B 43/26* | (2006.01) |

(Continued)

(52) U.S. Cl.
CPC . *C09K 8/665* (2013.01); *C09K 8/70* (2013.01); *C09K 2208/26* (2013.01)

(58) Field of Classification Search
CPC ........ C09K 8/62; C09K 8/64; C09K 2208/26; Y10S 507/922
USPC ........ 507/269, 272, 273, 276, 922; 166/308.1
See application file for complete search history.

(56) References Cited

U.S. PATENT DOCUMENTS

| | | | |
|---|---|---|---|
| 3,163,219 | A | 12/1964 | Wyant |
| 3,615,285 | A | 10/1971 | Whitney |

(Continued)

FOREIGN PATENT DOCUMENTS

CA    2 199 169 C    4/1997

OTHER PUBLICATIONS

"00360. Aluminum Potassium Sulfate: Explanatory Notes," The Merck Index, 14th ed., Merck & Co., Inc., Whitehouse Station, N.J., 2006, <http://www.knovel.com/web/portal/basic_search> [retrieved Jun. 14, 2011], 2 pages.

(Continued)

*Primary Examiner* — Aiqun Li
(74) *Attorney, Agent, or Firm* — Christensen O'Connor Johnson Kindness PLLC

(57) ABSTRACT

A fracturing fluid for a downhole environment is disclosed, comprising a water-sensitive gel; and a hydrated breaker. A fracturing fluid for a downhole environment is also disclosed, the fracturing fluid comprising a water-sensitive carrier and a breaker, the breaker comprising one or more hydrates, and wherein water of the one or more hydrates is releasable so as to act with the water-sensitive carrier to reduce the viscosity of the fluid. A method of treating a downhole environment with a fracturing fluid is also disclosed, the method comprising: providing to the downhole environment a fluid comprising a water-sensitive carrier and a breaker, the breaker comprising one or more hydrates; and allowing water from the one or more hydrates to release so as to act with the carrier to reduce the viscosity of the fluid.

3 Claims, 27 Drawing Sheets

(51) Int. Cl.
*C09K 8/66* (2006.01)
*C09K 8/70* (2006.01)

(56) References Cited

U.S. PATENT DOCUMENTS

| | | |
|---|---|---|
| 3,749,171 A | 7/1973 | Marx |
| 3,775,069 A | 11/1973 | Whitney |
| 3,846,310 A | 11/1974 | Blackwell |
| 4,104,173 A | 8/1978 | Gay |
| 4,407,897 A | 10/1983 | Farrell |
| 4,607,696 A | 8/1986 | Heller |
| 5,649,596 A | 7/1997 | Jones |
| 5,846,915 A | 12/1998 | Smith |
| 5,948,735 A | 9/1999 | Newlove |
| 5,951,970 A | 9/1999 | Wrede |
| 6,642,185 B2 | 11/2003 | Crews |
| 6,849,581 B1 | 2/2005 | Thompson |
| 7,066,262 B2 | 6/2006 | Funkhouser |

OTHER PUBLICATIONS

Farshad, F.F., et al., "Predicting Temperature Profiles in Producing Oil Wells Using Artificial Neural Networks," Engineering Computations 17(6):735-754, 2000.

International Search Report and Written Opinion mailed Feb. 21, 2011, issued in corresponding International Application No. PCT/CA2010/001701, filed Oct. 29, 2010, 7 pages.

Vrana, L.M., "Calcium Chloride," Kirk-Othmer Encyclopedia of Chemical Technology, Wiley, New York, 2001, vol. 4, pp. 557-570.

BREAKERS FOR GELLED FRACTURING FLUIDS

TECHNICAL FIELD

This document relates to breakers for gelled fracturing fluids.

BACKGROUND

In the conventional fracturing of wells, producing formations, new wells or low producing wells that have been taken out of production, a formation can be fractured to attempt to achieve higher production rates. Proppant and fracturing fluid are mixed and then pumped into a well that penetrates an oil or gas bearing formation. High pressure is applied to the well, the formation fractures and proppant carried by the fracturing fluid flows into the fractures. The proppant in the fractures holds the fractures open after pressure is relaxed and production is resumed. Various fluids have been disclosed for use as the fracturing fluid, including various mixtures of hydrocarbons, nitrogen and carbon dioxide.

Gelling agents are commonly used in hydraulic fracturing treatments in order to allow a fracturing fluid to carry sufficient amounts of proppant downhole. U.S. Pat. Nos. 3,775, 069 and 3,846,310 disclose gelling agents that form water-sensitive gels for hydrocarbon fracturing fluids. Various chemicals known as breakers may be added to these gelled fracturing fluids in order to reduce the viscosity of the gel and return the fluid to a pre-gel consistency. Breakers may also be timed to delay the breaking of the gel until a desire amount of time has elapsed, usually long enough to allow a fracturing fluid to deliver sufficient proppant into the created fractures. By breaking the gel after successful delivery of proppant, the reduced viscosity fracturing fluid may then be recovered leaving the delivered proppant behind in the formation to prop open the created fractures.

SUMMARY

A fracturing fluid for a downhole environment is disclosed, comprising a water-sensitive gel; and a hydrated breaker.

A fracturing fluid for a downhole environment is also disclosed, the fracturing fluid comprising a water-sensitive carrier and a breaker, the breaker comprising one or more hydrates, and wherein water of the one or more hydrates is releasable so as to act with the water-sensitive carrier to reduce the viscosity of the fluid.

A fracturing fluid for a downhole environment is also disclosed, the fracturing fluid comprising: a water-sensitive gel; and a hydrated breaker having a crystalline framework containing water that is bound within the crystalline framework and releasable into the fracturing fluid to act on the water-sensitive gel to reduce the viscosity of the fracturing fluid.

A fracturing fluid is also disclosed, comprising: liquefied petroleum gas; a water-sensitive gel; and a hydrated breaker having a crystalline framework containing water that is bound within the crystalline framework and releasable into the fracturing fluid to act on the water-sensitive gel to reduce the viscosity of the fracturing fluid.

A method of treating a downhole environment with a fracturing fluid is also disclosed, the method comprising: providing to the downhole environment a fluid comprising a water-sensitive carrier and a breaker, the breaker comprising one or more hydrates; and allowing water from the one or more hydrates to release so as to act with the carrier to reduce the viscosity of the fluid.

A method of treating a downhole environment is also disclosed, the method comprising: adding a gelling agent and a hydrated breaker to a fracturing fluid to produce a water-sensitive gel, the hydrated breaker having a crystalline framework containing water that is bound within the crystalline framework and releasable into the fracturing fluid to act on the water-sensitive gel to reduce the viscosity of the fracturing fluid; and treating an underground formation with the water-sensitive gel.

In various embodiments, there may be included any one or more of the following features: The water-sensitive carrier may be a water-sensitive gel. The hydrate may be a hydrated breaker having a crystalline framework containing water that is bound within the crystalline framework and releasable into the fracturing fluid to act on the water-sensitive gel to reduce the viscosity of the fracturing fluid. The water may be bound within the crystalline framework by forces that are sufficient to bind the water under a first set of conditions and insufficient to bind the water under a second set of conditions. The first set of conditions may comprise ambient surface temperature. The second set of conditions may correspond to the conditions of a selected downhole environment. The hydrated breaker may be selected to release water bound within the crystalline framework at a delayed rate under a set of conditions. The set of conditions may comprise temperatures at or above 40° Celsius. The set of conditions may comprise temperatures at or above 60° Celsius. The set of conditions may comprise temperatures at or above 100° Celsius. The crystalline framework may be saturated with water bound within the crystalline framework. The water bound within the crystalline framework may be present in an amount of 0.01-0.5% by volume of the fracturing fluid. The hydrated breaker may comprise a hydrated ionic salt breaker. The hydrated ionic salt breaker may comprises one or more of a sulfate and a chloride. The hydrated ionic salt breaker may comprise one or more of magnesium chloride, sodium sulfate, calcium sulfate, barium chloride, calcium chloride, aluminum sulfate, aluminum potassium sulfate, magnesium sulphate, and zinc sulphate. The hydrated ionic salt breaker may comprise aluminum potassium sulfate. The hydrated ionic salt breaker may comprise $AlK(SO_4)_2(12H_2O)$. The hydrated ionic salt breaker may comprise one or more of magnesium chloride, barium chloride, calcium chloride, magnesium sulphate, zinc sulfate, calcium sulphate, and aluminum sulphate. The hydrated ionic salt breaker may comprise one or more of $MgCl_2(6H_2O)$, $BaCl_2(2H_2O)$, $CaCl_2(6H_2O$, $MgSO_4(7H_2O)$, $ZnSO_4(7H_2O)$, $CaSO_4(2H_2O)$, $Al_2(SO_4)_3(16H_2O)$. The fracturing fluid may comprise hydrocarbon fluid. The hydrocarbon fluid may comprise liquefied petroleum gas. The water-sensitive gel may be made from a gelling agent that comprises a combination of an alkoxide of a group IIIA element and an alkoxide of an alkali metal. The group IIIA element may comprise one or more of boron and aluminum. The alkoxide of a group IIIA element may further comprise: $M^1(OR^1)(OR^2)(OR^3)$, in which $M^1$=the group IIIA element, and $R^1$, $R^2$, and $R^3$ are organic groups. The organic group of one or more of $R^1$, $R^2$, and $R^3$ may each comprise 2-10 carbon atoms. The organic group of one or more of $R^1$, $R^2$, and $R^3$ may each comprise an alkyl group. $M^1$ may be boron, and $R^1$, $R^2$, and $R^3$ may comprise 2-10 carbon atoms. The alkali metal may comprise one or more of lithium, sodium, and potassium. The alkoxide of an alkali metal may further comprise: $M^2(OR^4)$, in which $M^2$=the alkali metal, and $R^4$ comprises an organic group. The organic group of $R^4$ may comprise 2-24 carbon atoms. The organic group of $R^4$ may comprise 12 carbon atoms. $M^2$ may be lithium and the organic group of $R^4$ may comprise 2-24 carbon atoms. The water may be bound within the crystalline framework by forces that are variable with temperature and range from forces that, when the hydrated breaker is added to the fracturing fluid at surface the water is not released into the fracturing fluid, and when the fracturing fluid is within the downhole environment to be fractured, the water undergoes a controlled release into the fracturing fluid at a rate that is dependent on the temperature of the fracturing fluid within the downhole environment. The one or more hydrates may be configured to release water over one or both of: a particular period of time; and a particular range of temperature. The water-sensitive carrier may be formed from a fluid and one or more gelling agent. The fracturing fluid may be used to treat the downhole environment. Water from the one or more hydrates may be allowed to release so as to act with the carrier to reduce the viscosity of the fluid. The fluid of reduced viscosity may be removed from the formation. The fluid of reduced viscosity may be processed after removal from the formation. The fluid of reduced viscosity may be re-used after removal.

In some embodiments, a fluid is disclosed that comprises flowback from a well, the flowback comprising reduced viscosity fluids previously injected into the well as the fracturing fluids disclosed herein.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

TABLE 1

Characteristics of viscosity testing

Figure 1:
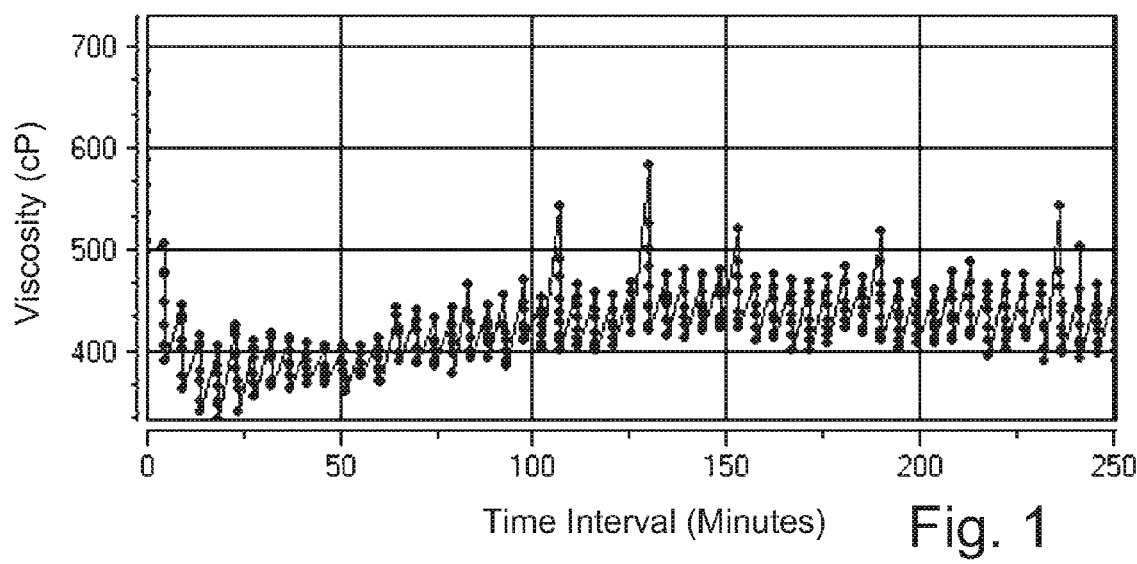
FIGS. 1-10K are graphs illustrating the results of viscosity testing of gelled pentane with various breakers. Table 1 summarizes the various testing characteristics for each graph. The percentage $H_2O$ values are the theoretical concentrations of the water molecules in the introduced breaker by volume of the gelled hydrocarbon fracturing fluid. Viscosity testing was carried out a Brookfield viscometer at 110 psi.
Figure 2A:
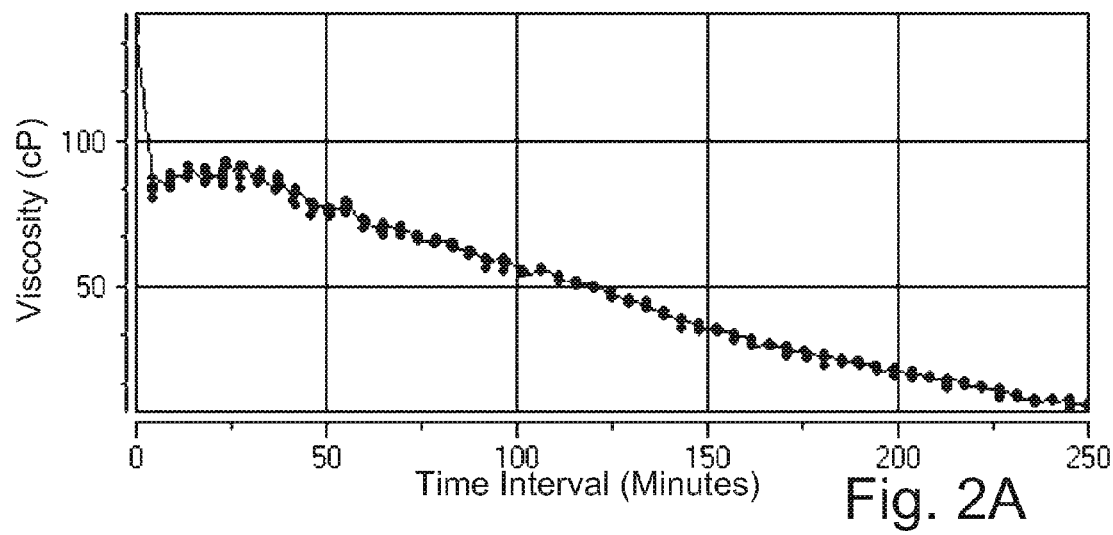
Figure 2B:
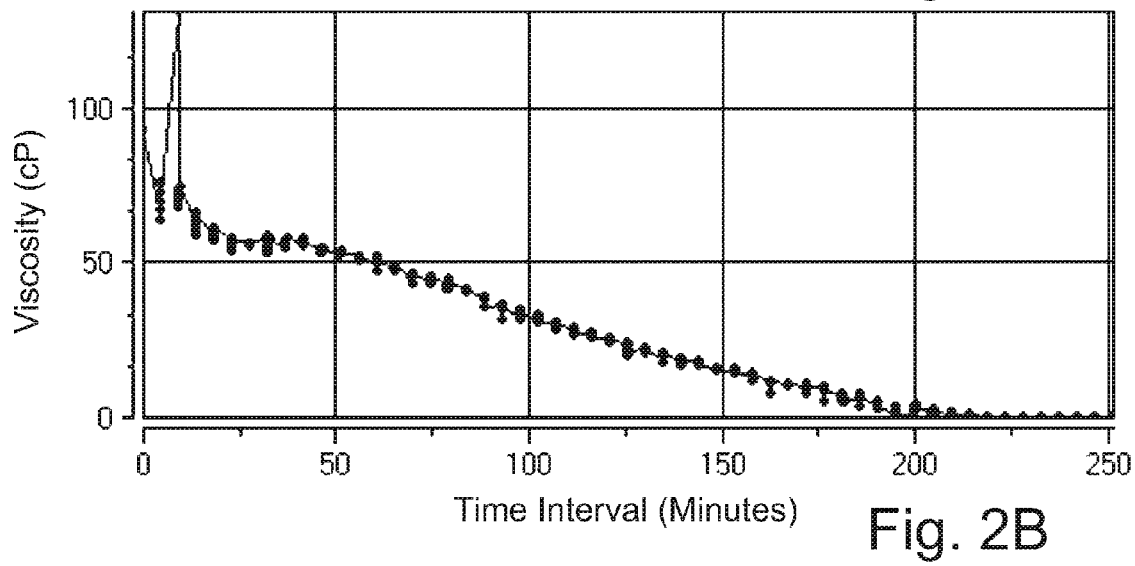
Figure 2C:
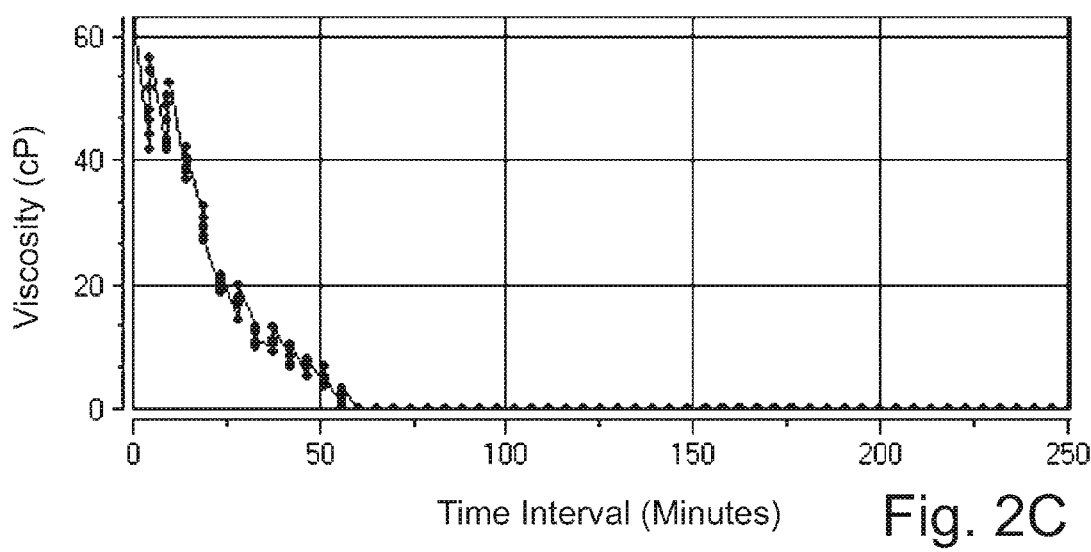
Figure 2D:
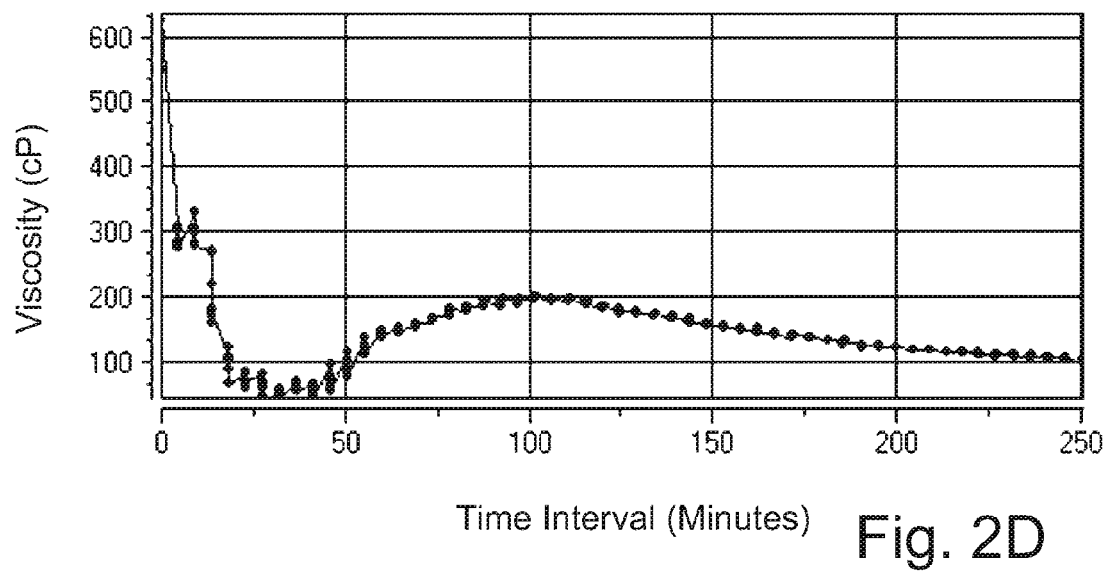
Figure 2E:
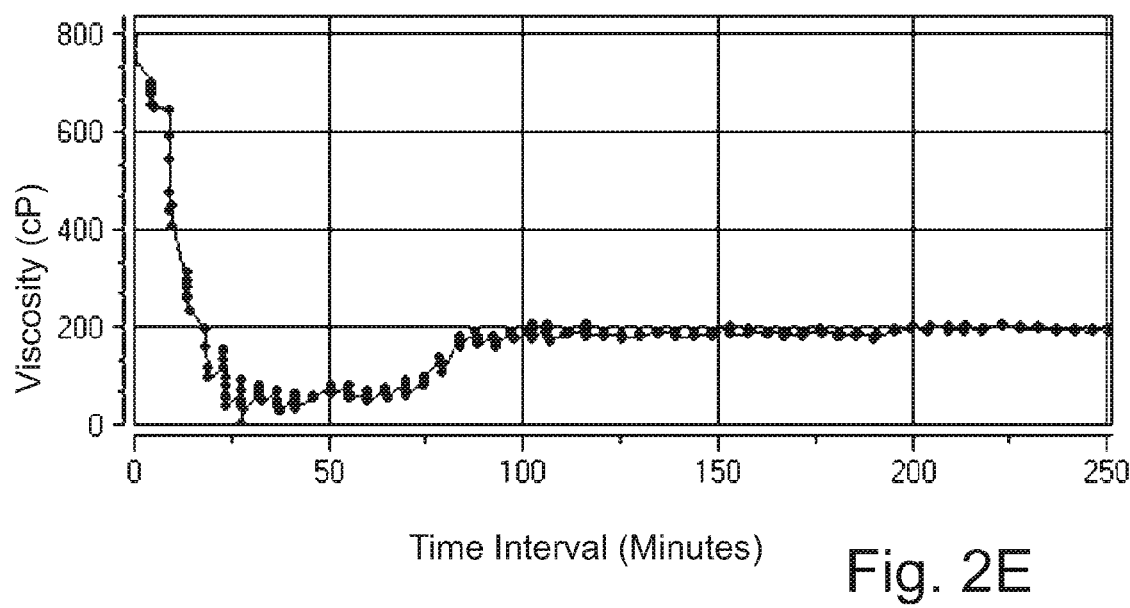
Figure 2F:
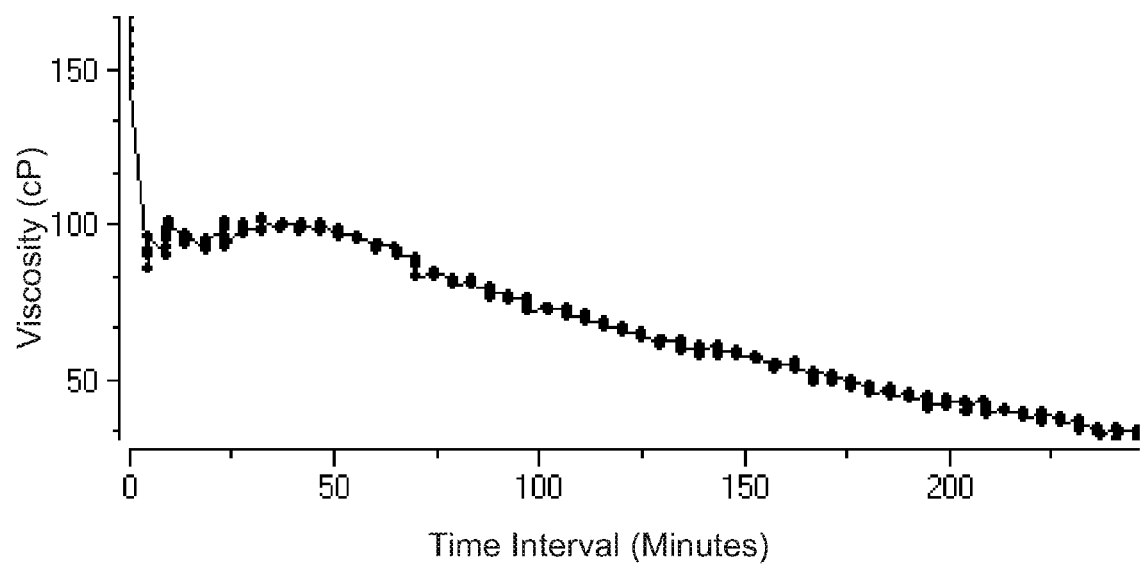
Figure 3A:
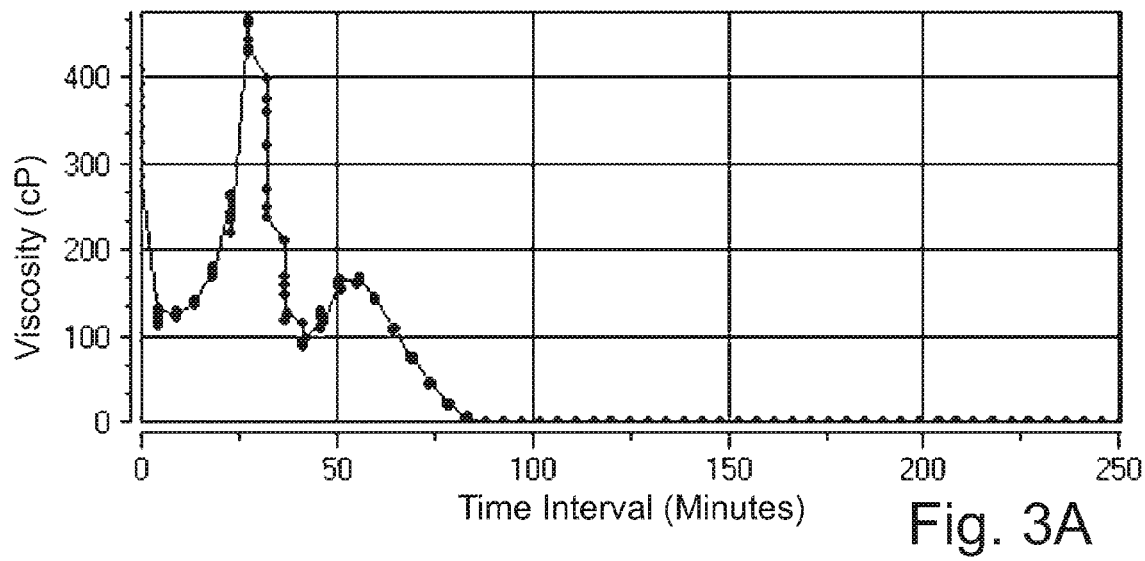
Figure 3B:
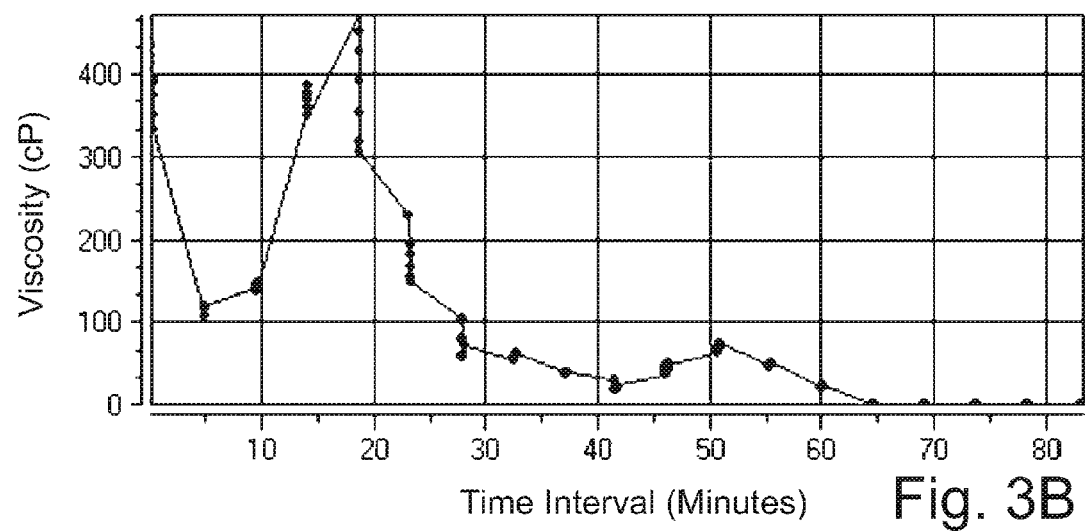
Figure 3C:
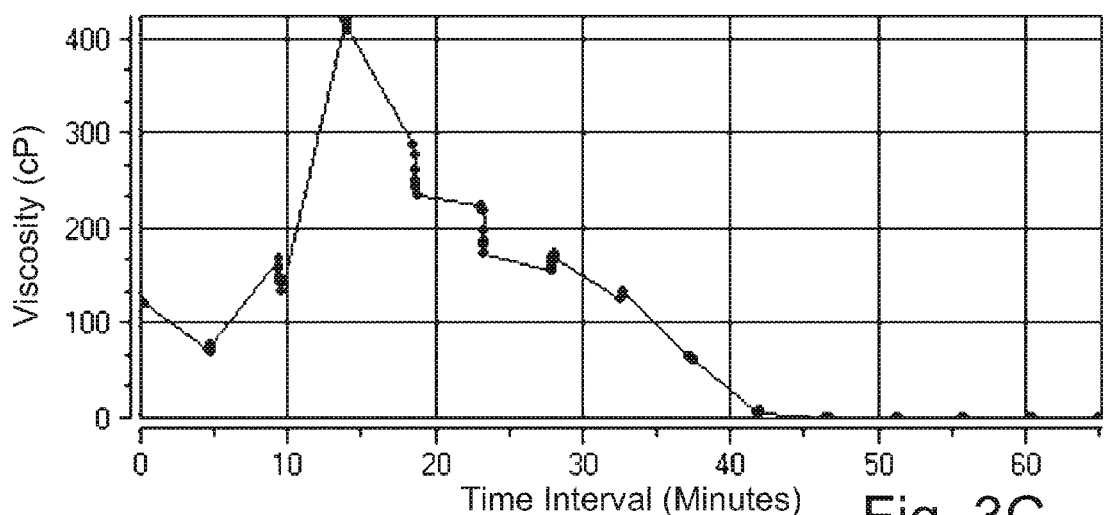
Figure 3D:
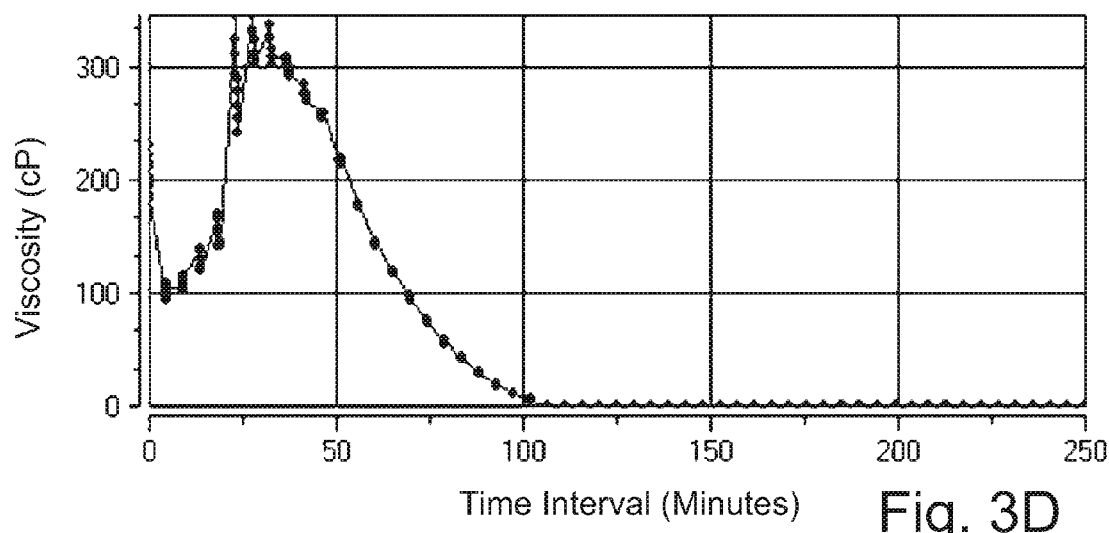
Figure 3E:
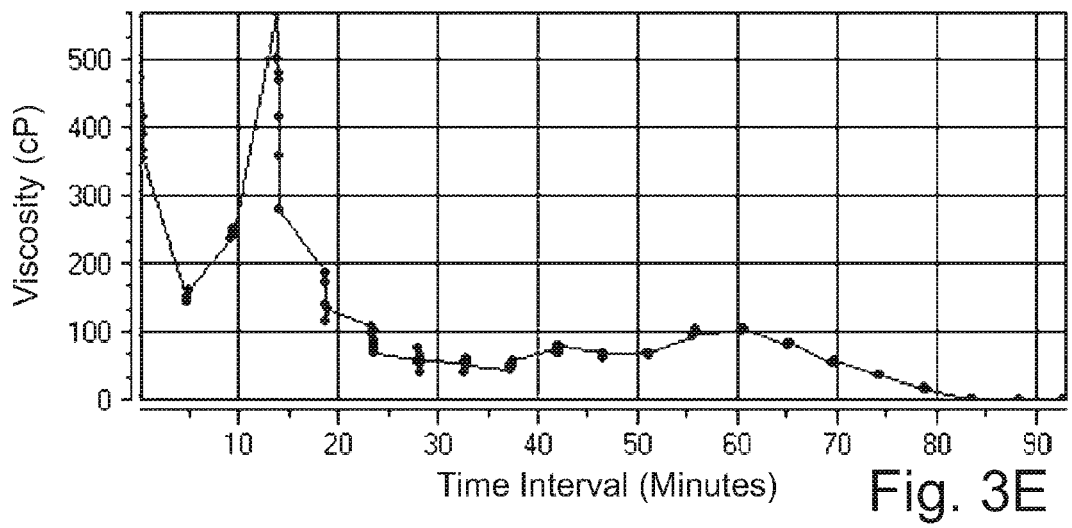
Figure 3F:
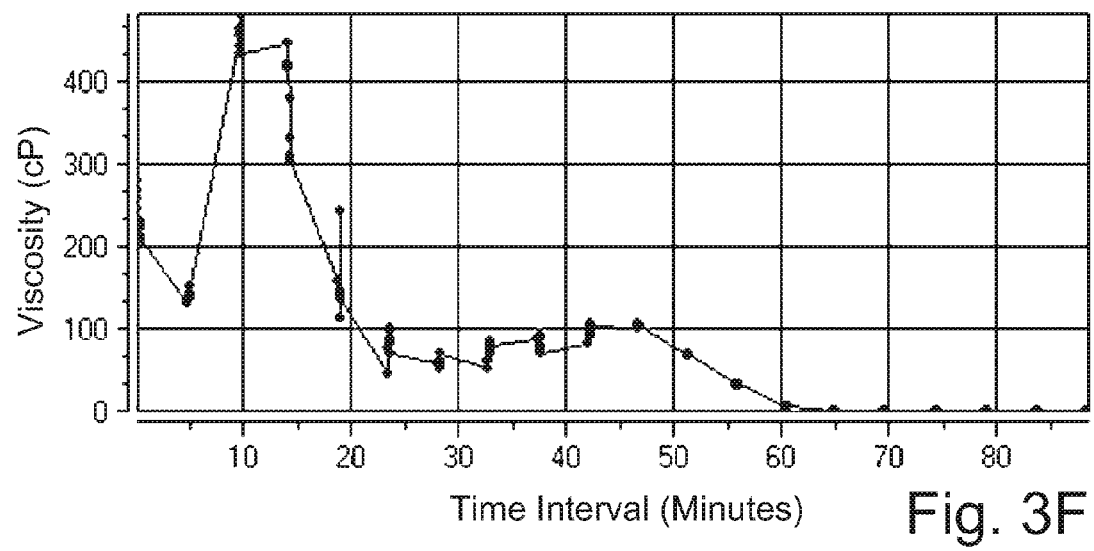
Figure 3G:
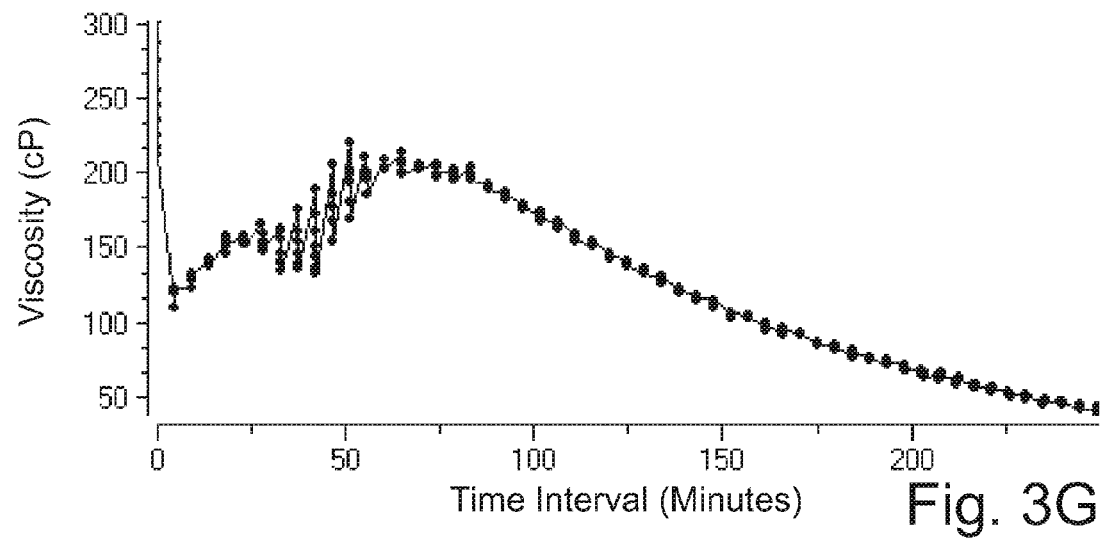
Figure 3H:
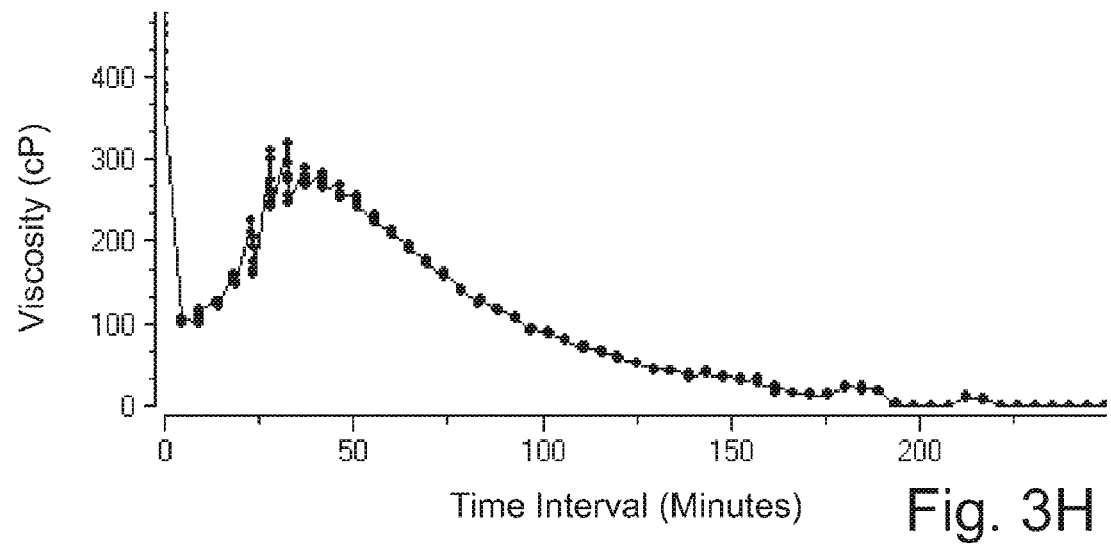
Figure 3I:
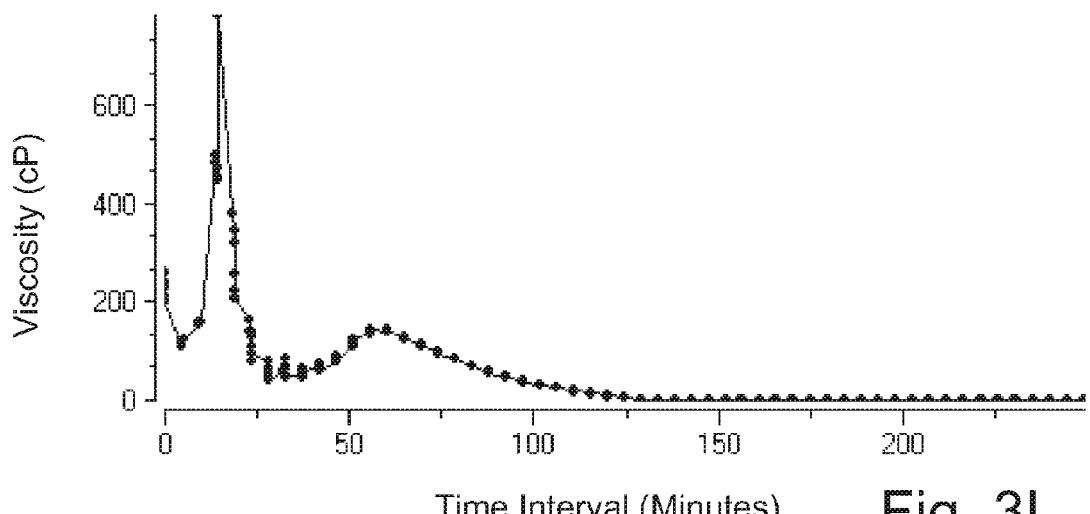

| FIG. | Breaker | Character of breaker | % of $H_2O$ | Temp (° C.) |
|---|---|---|---|---|
| 1 | None used | N/A | 0.00 | 23 |
| 2A | $Al_2(SO_4)_3(16H_2O)$ | 60 mesh | 0.15 | 60 |
| 2B | $Al_2(SO_4)_3(16H_2O)$ | 100 mesh | 0.15 | 60 |
| 2C | $Al_2(SO_4)_3(16H_2O)$ | 200 mesh | 0.15 | 60 |
| 2D | $Al_2(SO_4)_3(16H_2O)$ | 200 mesh | 0.10 | 60 |
| 2E | $Al_2(SO_4)_3(16H_2O)$ | 200 mesh | 0.05 | 60 |
| 2F | $Al_2(SO_4)_3(16H_2O)$ | 100 mesh | 0.10 | 60 |
| 3A | $AlK(SO_4)_2(12H_2O)$ | 60 mesh | 0.15 | 60 |
| 3B | $AlK(SO_4)_2(12H_2O)$ | 100 mesh | 0.15 | 60 |
| 3C | $AlK(SO_4)_2(12H_2O)$ | 200 mesh | 0.15 | 60 |
| 3D | $AlK(SO_4)_2(12H_2O)$ | 60 mesh | 0.10 | 60 |
| 3E | $AlK(SO_4)_2(12H_2O)$ | 100 mesh | 0.10 | 60 |
| 3F | $AlK(SO_4)_2(12H_2O)$ | 200 mesh | 0.10 | 60 |
| 3G | $AlK(SO_4)_2(12H_2O)$ | 60 mesh | 0.05 | 60 |
| 3H | $AlK(SO_4)_2(12H_2O)$ | 100 mesh | 0.05 | 60 |
| 3I | $AlK(SO_4)_2(12H_2O)$ | 200 mesh | 0.05 | 60 |
| 4A | $BaCl_2(2H_2O)$ | 60 mesh | 0.15 | 60 |
| 4B | $BaCl_2(2H_2O)$ | 100 mesh | 0.15 | 60 |
| 4C | $BaCl_2(2H_2O)$ | 60 mesh | 0.10 | 60 |
| 4D | $BaCl_2(2H_2O)$ | 100 mesh | 0.10 | 60 |
| 4E | $BaCl_2(2H_2O)$ | 200 mesh | 0.10 | 60 |
| 4F | $BaCl_2(2H_2O)$ | 60 mesh | 0.05 | 60 |
| 4G | $BaCl_2(2H_2O)$ | 100 mesh | 0.05 | 60 |
| 4H | $BaCl_2(2H_2O)$ | 200 mesh | 0.05 | 60 |
| 4I | $BaCl_2(2H_2O)$ | Ground and passed through a 100 mesh screen | 0.15 | 60 |
| 5A | $CaCl_2(6H_2O)$ | 60 mesh | 0.15 | 60 |
| 5B | $CaCl_2(6H_2O)$ | 200 mesh | 0.10 | 60 |
| 5C | $CaCl_2(6H_2O)$ | 200 mesh | 0.05 | 60 |
| 6A | $CaSO_4(2H_2O)$ | 60 mesh | 0.15 | 60 |
| 6B | $CaSO_4(2H_2O)$ | 100 mesh | 0.15 | 60 |
| 7A | $MgCl_2(6H_2O)$ | Ground and passed through a 100 mesh screen | 0.34 | 60 |
| 7B | $MgCl_2(6H_2O)$ | Unground | 0.32 | 23 |
| 7C | $MgCl_2(6H_2O)$ | Ground | 0.32 | 60 |
| 7D | $MgCl_2(6H_2O)$ | Ground and passed through a 100 mesh screen | 0.32 | 60 |
| 7E | $MgCl_2(6H_2O)$ | Ground and passed through a 100 mesh screen | 0.24 | 60 |
| 7F | $MgCl_2(6H_2O)$ | Unground | 0.16 | 60 |
| 7G | $MgCl_2(6H_2O)$ | 60 mesh | 0.15 | 60 |
| 7H | $MgCl_2(6H_2O)$ | 100 mesh | 0.15 | 60 |
| 7I | $MgCl_2(6H_2O)$ | Ground and passed through a 100 mesh screen | 0.14 | 60 |
| 8A | $MgSO_4(7H_2O)$ | 60 mesh | 0.15 | 60 |
| 8B | $MgSO_4(7H_2O)$ | 200 mesh | 0.15 | 60 |
| 8C | $MgSO_4(7H_2O)$ | 100 mesh | 0.15 | 60 |
| 8D | $MgSO_4(7H_2O)$ | 60 mesh | 0.10 | 60 |
| 8E | $MgSO_4(7H_2O)$ | 100 mesh | 0.10 | 60 |
| 8F | $MgSO_4(7H_2O)$ | 200 mesh | 0.10 | 60 |
| 8G | $MgSO_4(7H_2O)$ | 60 mesh | 0.05 | 60 |
| 8H | $MgSO_4(7H_2O)$ | 100 mesh | 0.05 | 60 |
| 8I | $MgSO_4(7H_2O)$ | 200 mesh | 0.05 | 60 |
| 9A | $ZnSO_4(7H_2O)$ | 60 mesh | 0.15 | 60 |
| 9B | $ZnSO_4(7H_2O)$ | 100 mesh | 0.15 | 60 |
| 9C | $ZnSO_4(7H_2O)$ | 200 mesh | 0.15 | 60 |
| 9D | $ZnSO_4(7H_2O)$ | 60 mesh | 0.10 | 60 |
| 9E | $ZnSO_4(7H_2O)$ | 100 mesh | 0.10 | 60 |
| 9F | $ZnSO_4(7H_2O)$ | 200 mesh | 0.10 | 60 |
| 9G | $ZnSO_4(7H_2O)$ | 60 mesh | 0.05 | 60 |
| 9H | $ZnSO_4(7H_2O)$ | 100 mesh | 0.05 | 60 |
| 9I | $ZnSO_4(7H_2O)$ | 200 mesh | 0.05 | 60 |
| 10A | $Na_2SO_4(10H_2O)$ | 60 mesh | 0.15 | 60 |
| 10B | $Na_2SO_4(10H_2O)$ | 100 mesh | 0.15 | 60 |
| 10C | $Na_2SO_4(10H_2O)$ | 200 mesh | 0.15 | 60 |
| 10D | $Na_2SO_4(10H_2O)$ | Ground and passed through a 100 mesh screen | 0.13 | 60 |
| 10E | $Na_2SO_4(10H_2O)$ | 60 mesh | 0.10 | 60 |
| 10F | $Na_2SO_4(10H_2O)$ | 100 mesh | 0.10 | 60 |
| 10G | $Na_2SO_4(10H_2O)$ | 200 mesh | 0.10 | 60 |
| 10H | $Na_2SO_4(10H_2O)$ | 60 mesh | 0.05 | 60 |
| 10I | $Na_2SO_4(10H_2O)$ | Ground and pass through a 100 mesh screen | 0.10 | 60 |
| 10J | $Na_2SO_4(10H_2O)$ | 100 mesh | 0.05 | 60 |
| 10K | $Na_2SO_4(10H_2O)$ | 200 mesh | 0.05 | 60 |

Figure 11:
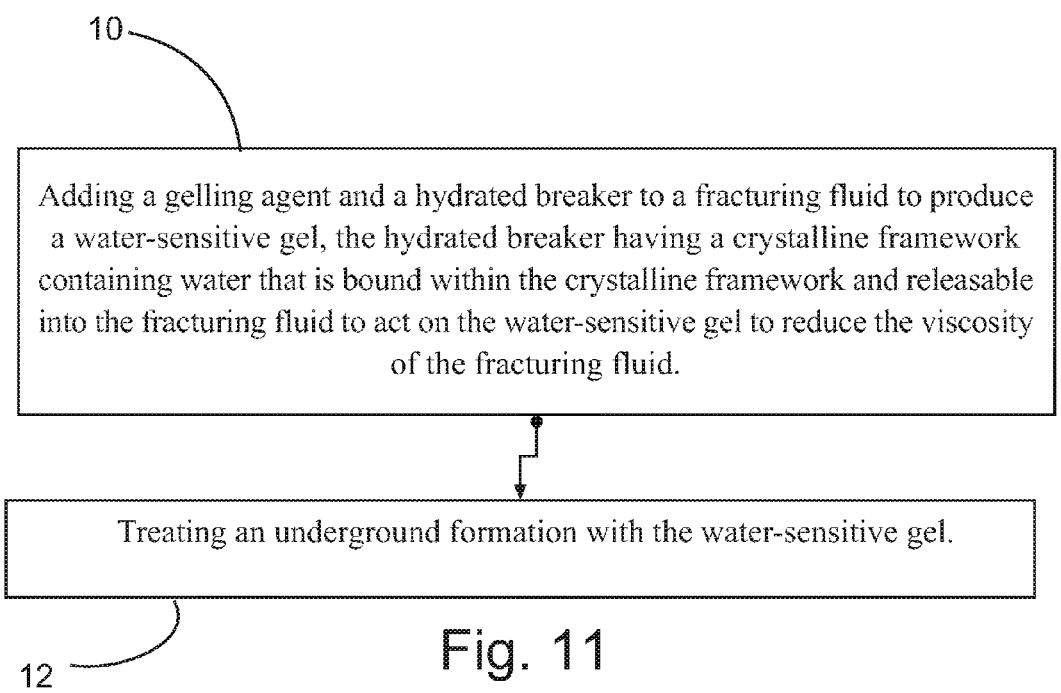

FIG. 11 is a flow diagram for a method of treating a downhole environment.

Figure 12:
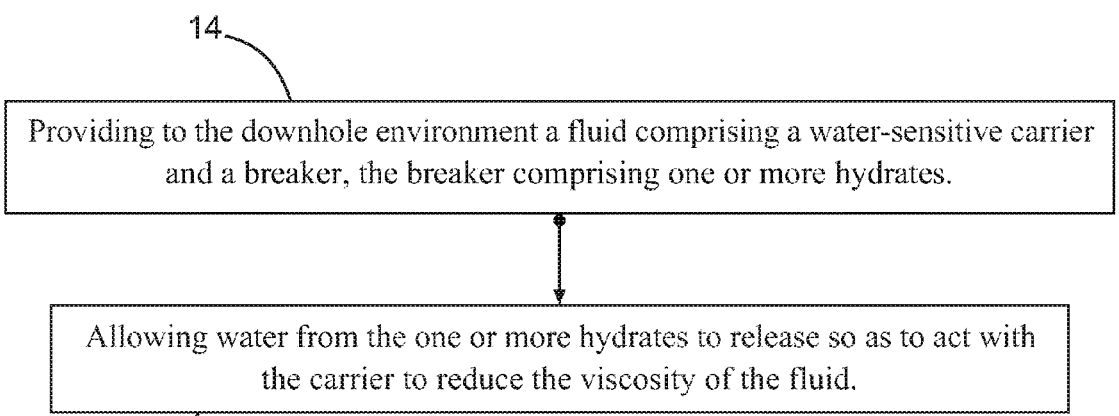

FIG. 12 is a flow diagram for a method of treating a downhole environment with a fracturing fluid.

DETAILED DESCRIPTION

Immaterial modifications may be made to the embodiments described here without departing from what is covered by the claims.

Hydrates contain water, which may be tied up within a crystalline framework of the hydrate. The water may be tied up as a water of crystallization that occurs in salt crystals but that is not covalently bonded to a host molecule or ion. Upon crystallization from water or moist solvents, many compounds incorporate water molecules into their crystalline frameworks, forming hydrates. Often, a salt of interest cannot be crystallized in the absence of water, even though no strong bonds to the guestwater molecules may be apparent. Many hydrated ionic salts have multiple stable hydrates with different ratios of water molecules to parent salt. The structure of hydrates can be quite elaborate, because of the existence of hydrogen bonds that define these polymeric structures.

Many hydrated compounds give off various amounts of water molecules under ambient or specific temperatures and conditions. For all hydrated ionic salts, heat can be used to drive off the water molecules. For example, a variety of hydrates are known with the formula $MgCl_2(xH_2O)$, and each is known to lose water with increasing temperature: x=12 (−16.4° C.), 8 (−3.4° C.), 6 (116.7° C.), 4 (181° C.), 2 (ca. 300° C.).

Disclosed herein are fracturing fluids for a downhole environment, the fluids comprising a water-sensitive carrier such as a water sensitive-gel, and a breaker. The breaker may comprise one or more hydrates, wherein water of the one or more hydrates is releasable so as to act with the water-sensitive carrier to reduce the viscosity of the fluid.

The hydrate, for example a hydrated ionic salt breaker, may have a crystalline framework containing water that is bound within the crystalline framework and releasable into the fracturing fluid to act on the water-sensitive gel to reduce the viscosity of the fracturing fluid. The fracturing fluid may also comprise a hydrocarbon fluid, for example C3-C20 fluids such as liquefied petroleum gas. In some embodiments, a fracturing fluid is disclosed having a water-sensitive gel and a hydrated breaker. The hydrate may have the formula of Y.x$(H_2O)$, in which Y is the formula of the anhydrous form of the breaker, and x is the number of molecules of water bound within the crystalline framework, x being equal to more than zero.

The water may be bound within the crystalline framework by forces that are sufficient to bind the water under a first set of conditions, for example ambient surface conditions, and insufficient to bind the water under a second set of conditions, for example the conditions of a selected downhole environment. Ambient surface conditions, such as ambient surface temperature, may refer to the conditions that the fracturing fluid is stored or produced at above ground. In some cases, ambient surface conditions include atmospheric pressure, although the fracturing fluid may be produced under higher pressures such as pumping pressures, particularly if the fracturing fluid is produced right before being pumped into a formation. The first set of conditions, which may include temperatures cooler than surface temperatures if the fracturing fluid is kept in a refrigerated state, allow the fracturing fluid to be stored for a desired length of time in a useful state prior to being used. The second set of conditions may refer to the conditions that the fracturing fluid will experience while being used to treat the particular underground formation that the fracturing fluid is targeted for. The second set of conditions, such as the temperature of a particular downhole environment, may be determined from measurements or estimated. Estimations may be made from knowledge of the depth and character of the downhole environment. On-shore wells typically increase in temperature by 3° C. per 100 m of depth. In some embodiments, only a portion of the bound water is releasable in the selected downhole environment.

In some embodiments, the water is bound within the crystalline framework by forces that are variable with temperature and range from forces that, when the hydrated breaker is added to the fracturing fluid at surface the water is not released into the fracturing fluid, and when the fracturing fluid is within the downhole environment to be fractured, the water undergoes a controlled release into the fracturing fluid at a rate that is dependent on the temperature of the fracturing fluid within the downhole environment.

The breaker may be selected to release water bound within the crystalline framework at a delayed rate under a set of conditions, for example the second set of conditions discussed above. As water is released in a controlled fashion, the water may act to degrade the gel and reduce the viscosity of the fracturing fluid down to normal. The breaker, such as an ionic metal salt breaker, may be substantially insoluble in the fracturing fluid, and thus during blending the breaker will disperse evenly throughout the fluid and thus be able to act to degrade the entire gel in a uniform fashion. In some embodiments the breaker is substantially insoluble in water. The set of conditions may be for example temperatures at or above 40° C., 60° C., 100° C., or higher temperatures.

The crystalline framework of the hydrated breaker may be saturated with water bound within the crystalline framework. This way, short of introducing water directly into the fracturing fluid, the hydrate will carry the maximum amount of water possible in its crystal structure for delivery to the fracturing fluid. In some embodiments the water bound within the crystalline framework is present in an amount of 0.01-0.5% by volume of the fracturing fluid.

Various hydrated ionic salt breakers, such as ionic metal salts, may be used. For example, the hydrated ionic salt breaker may comprise one or more of a sulfate and a chloride, for further example if the hydrated ionic salt breaker comprises one or more of magnesium chloride, sodium sulfate, calcium sulfate, barium chloride, calcium chloride, aluminum sulfate, aluminum potassium sulfate, magnesium sulphate, and zinc sulphate. Various other hydrated ionic salt breakers are expected to be suitable as they are substantially insoluble in, and thus generally inert with regards to, the fracturing fluid itself, and yet they able to release water in a predictable fashion into the fracturing fluid to break the gel. Because of the similar hydrophobic nature of hydrocarbon fluid and liquefied petroleum gas, hydrated ionic salt breakers are expected to function in a similar fashion in liquefied petroleum gas as in higher weight hydrocarbon fluids such as the pentane tested. In some embodiments the ionic salt is the product of a strong acid and a strong base. The ionic salt may form a weak acid or base in water.

Examples of suitable delayed hydrated ionic salt breakers include magnesium chloride, barium chloride, calcium sulphate, and aluminum sulphate magnesium chloride. Results from testing illustrate that gel break delays may be achieved using aluminum sulphate (for example $Al_2(SO_4)_3(16H_2O)$, see FIGS. 2A-2D and 2E), barium chloride (for example $BaCl_2(2H_2O)$, see FIGS. 4A-I), calcium chloride (for example $CaCl_2(6H_2O)$, see FIGS. 5A-5C), calcium sulphate (for example $CaSO_4(2H_2O)$, see FIGS. 6A-B), magnesium chloride (for example $MgCl_2(6H_2O)$, see FIGS. 7A-E and 7G-I), magnesium sulphate (for example $MgSO_4(7H_2O)$, see FIGS. 8A-I), and zinc sulfate (for example $ZnSO_4(7H_2O)$, see FIGS. 9A-H). Referring to FIGS. 3A-3I, aluminum potassium sulfate, for example $AlK(SO_4)$—$_2(12H_2O)$ is another example of a delayed breaker.

Figure 4A:
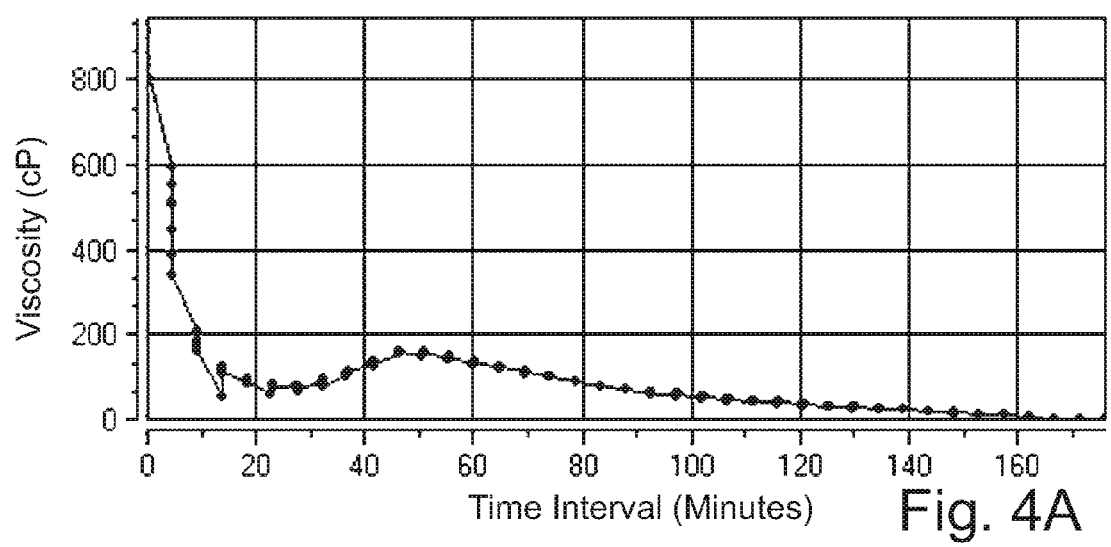
Figure 4B:
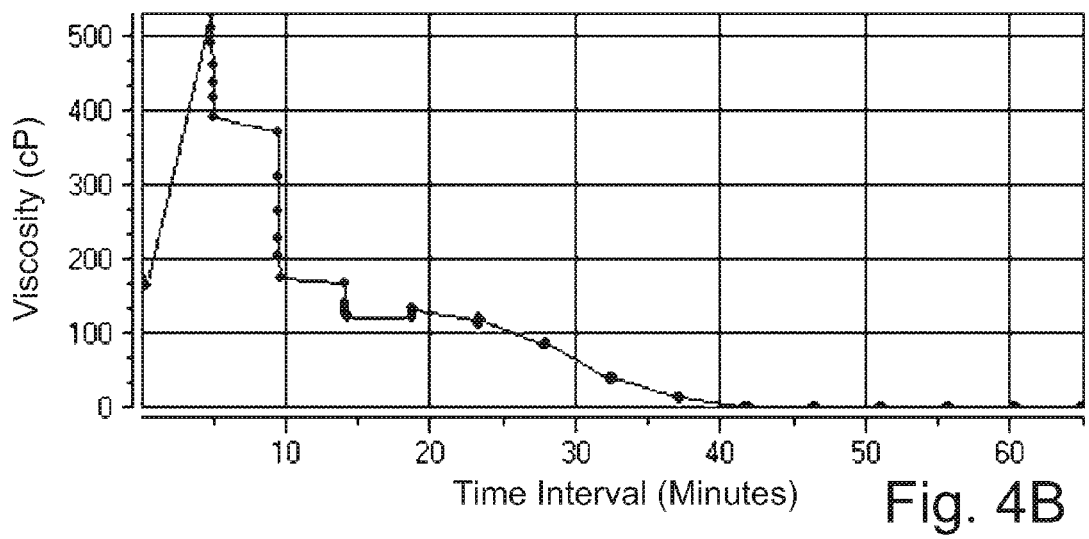
Figure 4C:
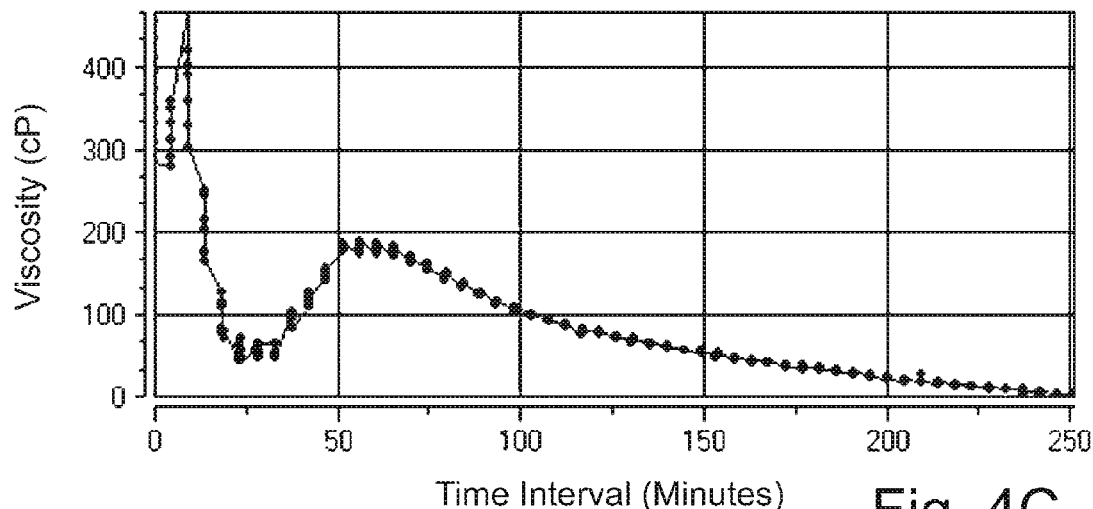
Figure 4D:
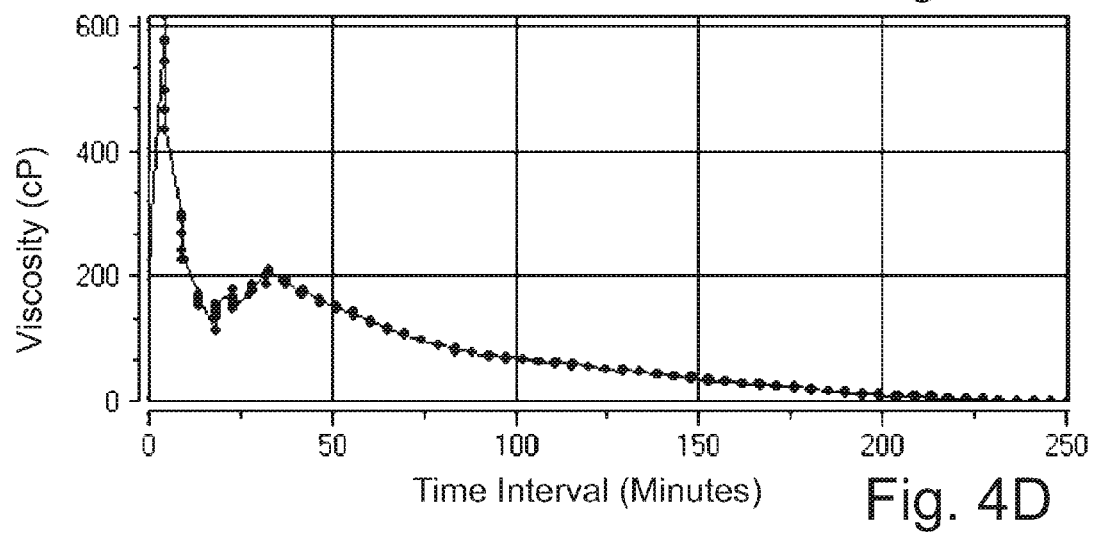
Figure 4E:
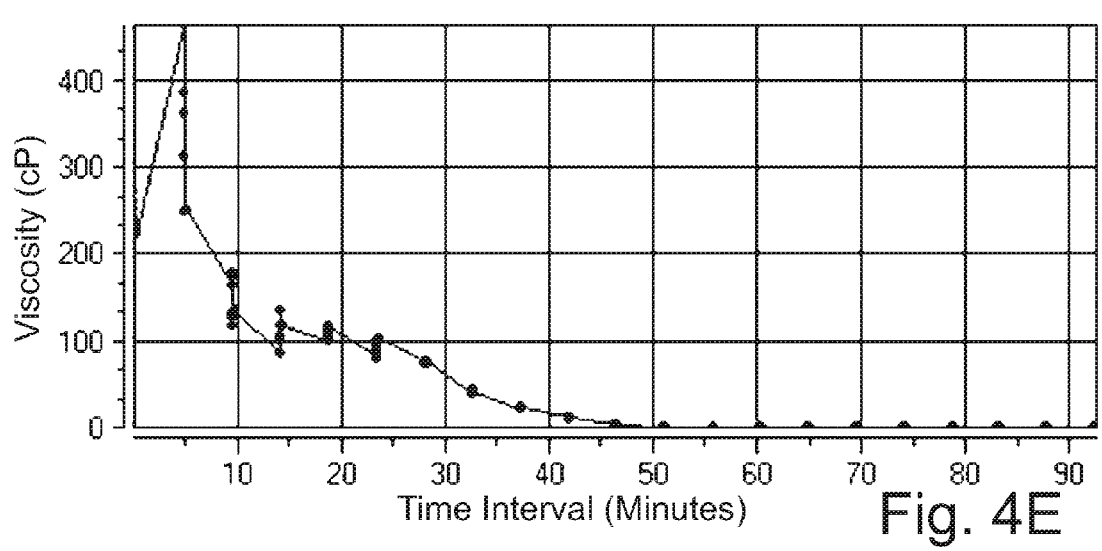
Figure 4F:
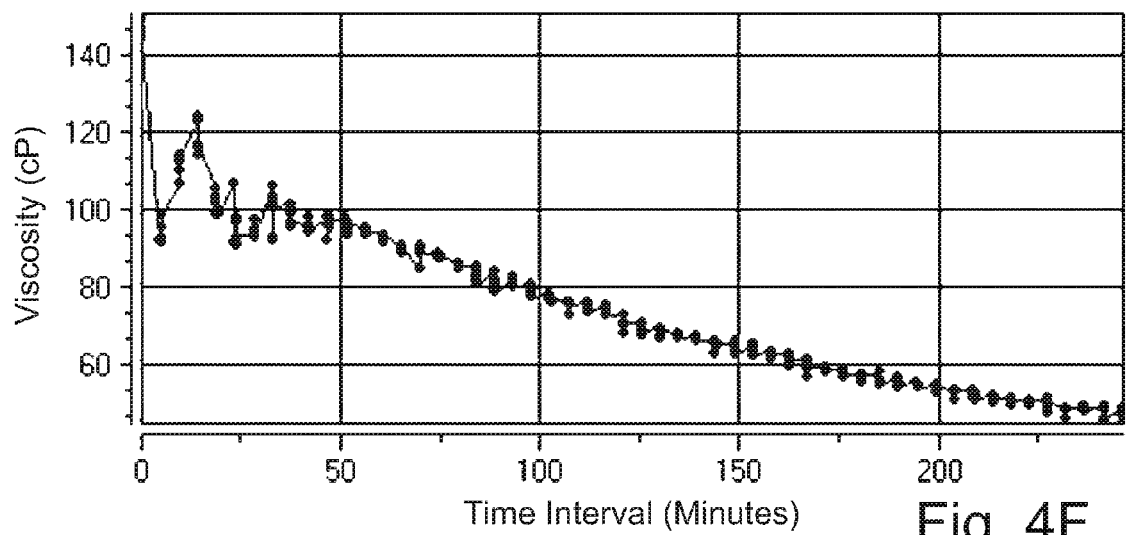
Figure 4G:
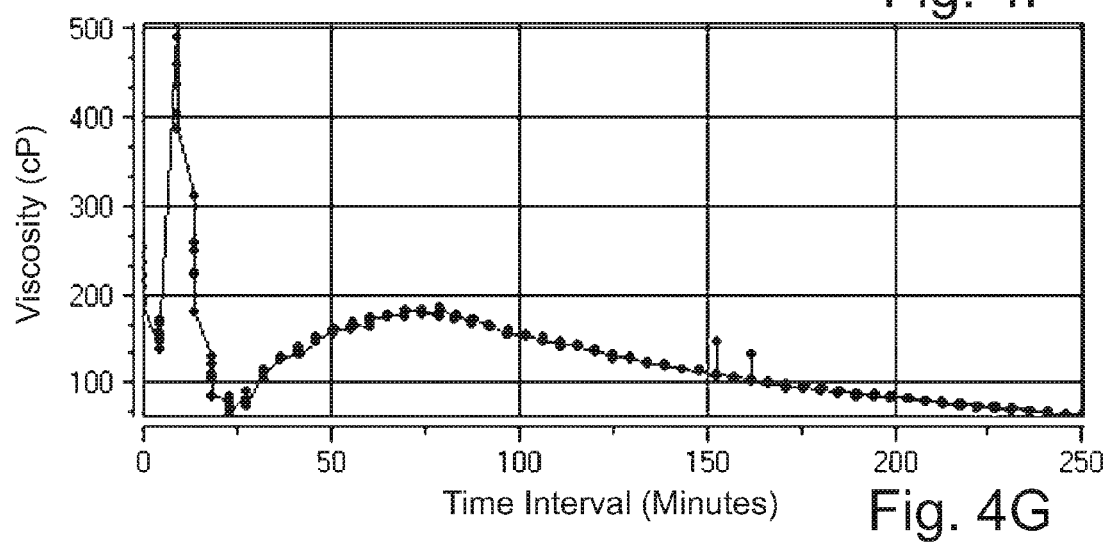
Figure 4H:
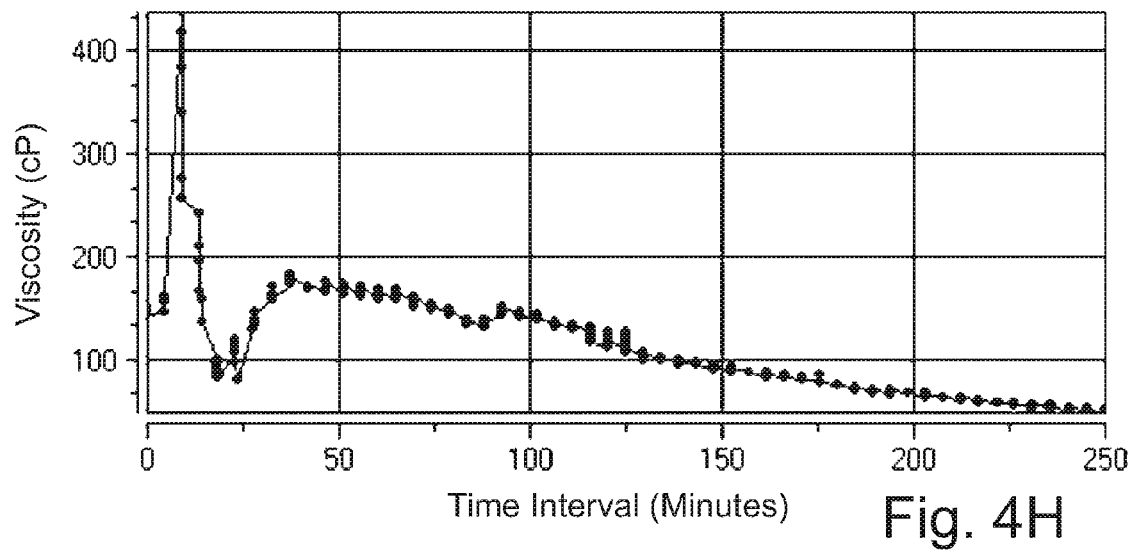
Figure 4I:
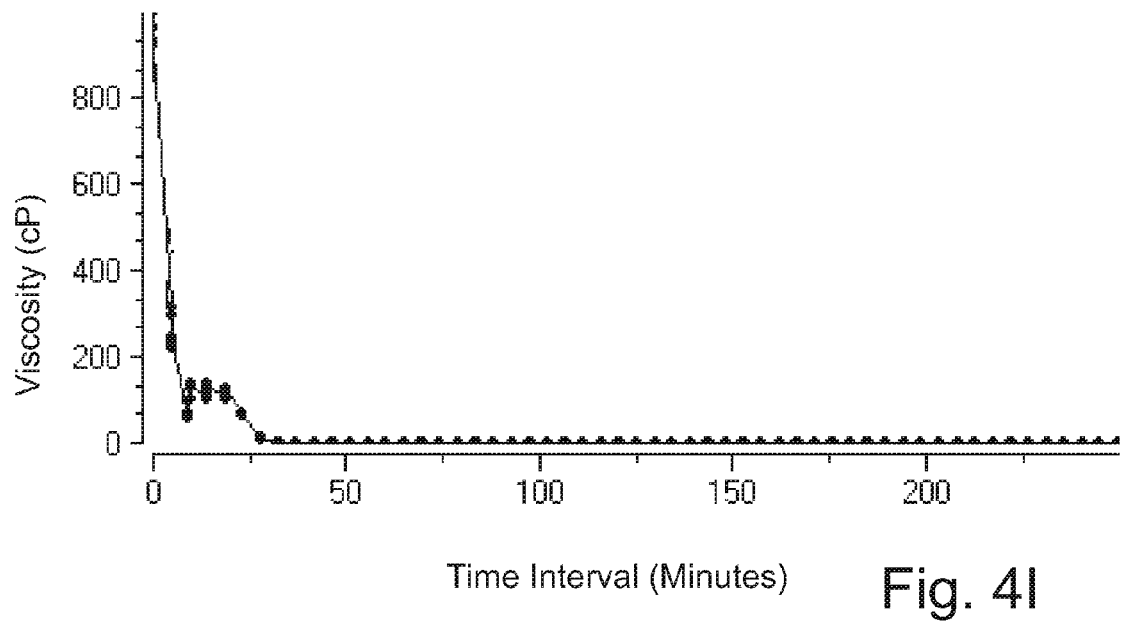
Figure 5A:
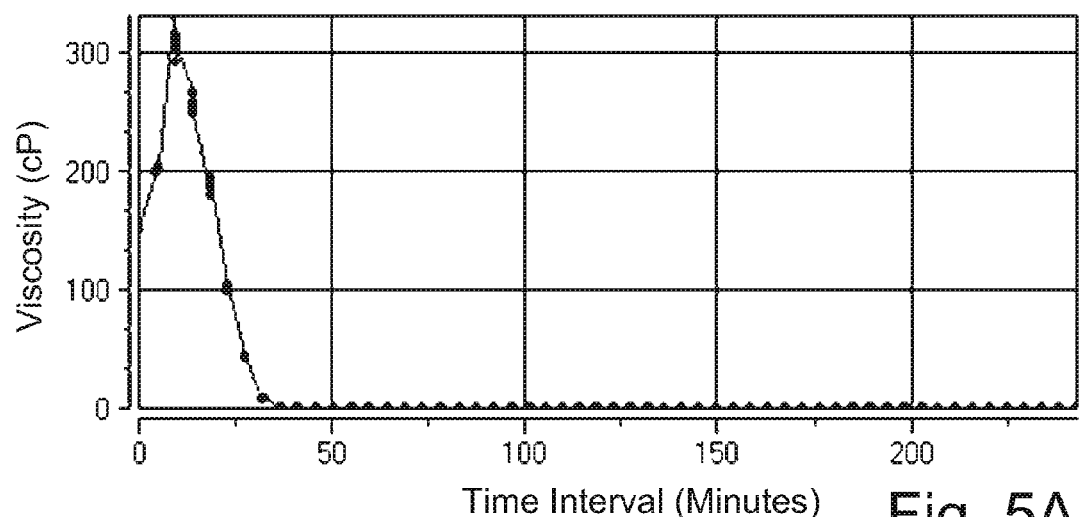
Figure 5B:
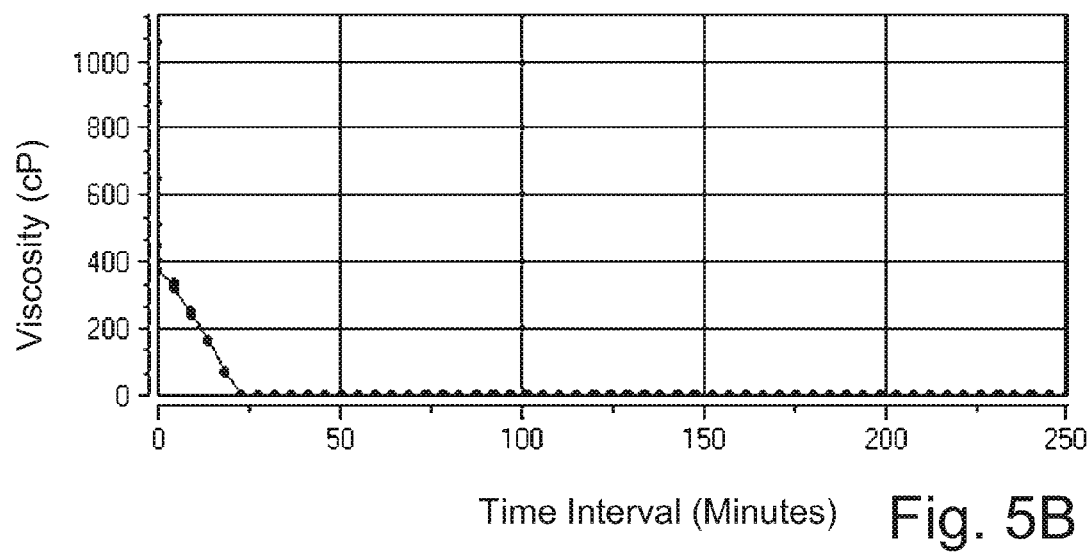
Figure 5C:
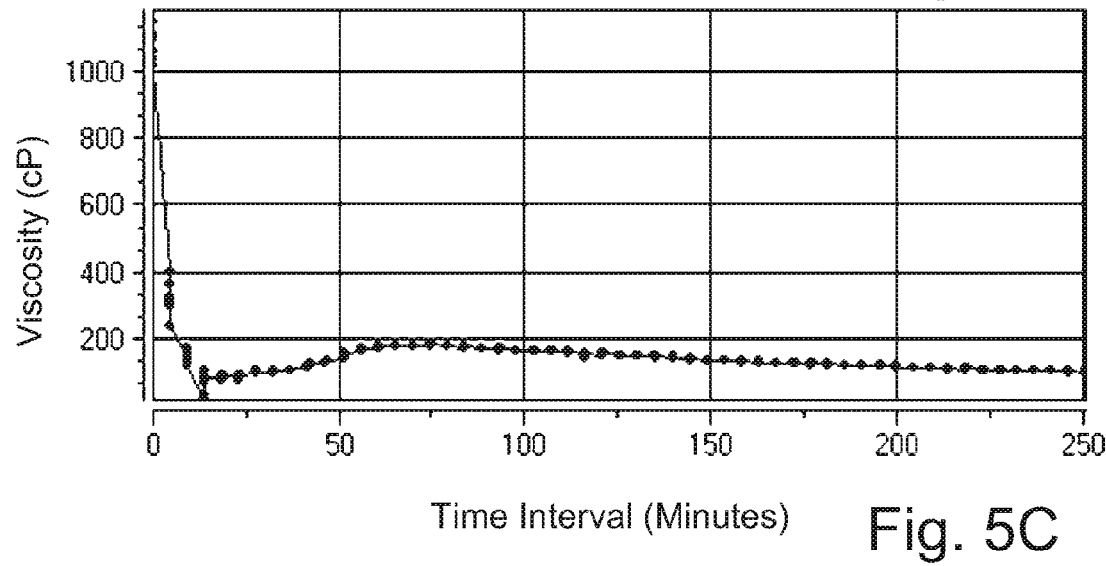

As illustrated in the exemplary data provided herein, the particle size of the breaker may be selected to modify the delay times of the breaker. For example, referring to FIGS. 4C and 4D, a larger particle size such as 60 mesh (FIG. 4C) has a more delayed effect than the same breaker at 100 mesh (FIG. 4D). To achieve the desired mesh size, breaker was passed through a mesh size coarser than the desired mesh size, and the breaker left on top of the mesh was then used. For example, to achieve the indicated mesh size of 60 mesh, the breaker was passed through a 40 mesh sieve, and the breaker left on top of the 40 mesh sieve was then used as 60 mesh breaker. Breakers used herein may comprise breakers that are ground or unground. Breakers may also be passed through a certain mesh size, such as passed through a 40-250 mesh screen for example. Breakers may also be 40-250 mesh as an example. Breakers may be added directly as a solid or dispersed in a separate fluid. Sodium sulphate, used as a hydrated ionic salt breaker, is illustrated in FIGS. 10A-K (for example $Na_2SO_4(10H_2O)$).

Exemplary gelling agents that may be used are disclosed by Whitney in U.S. Pat. Nos. 3,775,069 and 3,846,310, the specifications of which are incorporated by reference. An example of a suitable gelling agent used to make the water-sensitive gel comprises a combination of an alkoxide of a group IIIA element and an alkoxide of an alkali metal. When combined, the alkoxide of the group IIIA element and the alkoxide of the alkali metal react to form a polymer gel.

The group IIIA element may comprise one or more of boron and aluminum for example. In some embodiments, the alkoxide of a group IIIA element comprises $M^1(OR^1)(OR^2)(OR^3)$, in which $M^1$=the group IIIA element, and $R^1$, $R^2$, and $R^3$ are organic groups. Each of the organic groups of $R^1$, $R^2$, and $R^3$ may have 2-10 carbon atoms, and may comprise an alkyl group. In one embodiment, $M^1$=boron, and $R^1$, $R^2$, and $R^3$ comprise 2-10 carbon atoms.

The alkali metal may comprise one or more of lithium, sodium, and potassium for example. In some embodiments, the alkoxide of an alkali metal further comprises $M^2(OR^4)$, in which $M^2$=the alkali metal, and $R^4$ comprises an organic group. The organic group of $R^4$ may comprise 2-24 carbon atoms, for further example 12 carbon atoms, and may comprise an alkyl group. In one embodiment, $M^2$=lithium and the organic group of $R^4$ comprises 2-24 carbon atoms.

In some embodiments, $R^4$ may further comprise: $(AQ)_n(R^5)_x(R^6)_y$. in which A is an organic group, Q is O or N, n is 1-10, $R^5$ and $R^6$ are organic groups, x is either 1 or 2 depending on the valence of Q, and y is 0 or 1 depending on the valence of Q. Thus, the alkoxide of an alkali metal formed would have the formula: $M^2O(AQ)_n(R^5)_x(R^6)_y$. A may have 2-4 carbon atoms. The organic groups of $R^5$ and $R^6$ may each have 1-16 carbons. Where y=1, $R^6$ is bonded to the Q atom. Organic groups as disclosed herein may refer to groups with at least one carbon atom, as long the resulting gelling agent is suitable for its purpose. Examples of organic groups include phenyl, aryl, alkenyl, alkynyl, cyclo, and ether groups. A suitable amount of gelling agent may be used, for example 0.25-5% by weight of the fracturing fluid. In addition, the a suitable ration of the alkoxide of a group IIIA element and the alkoxide of an alkali metal may be used, for example 3:1 to 1:3, with 1:1 being a preferable ratio.

Figure 6A:
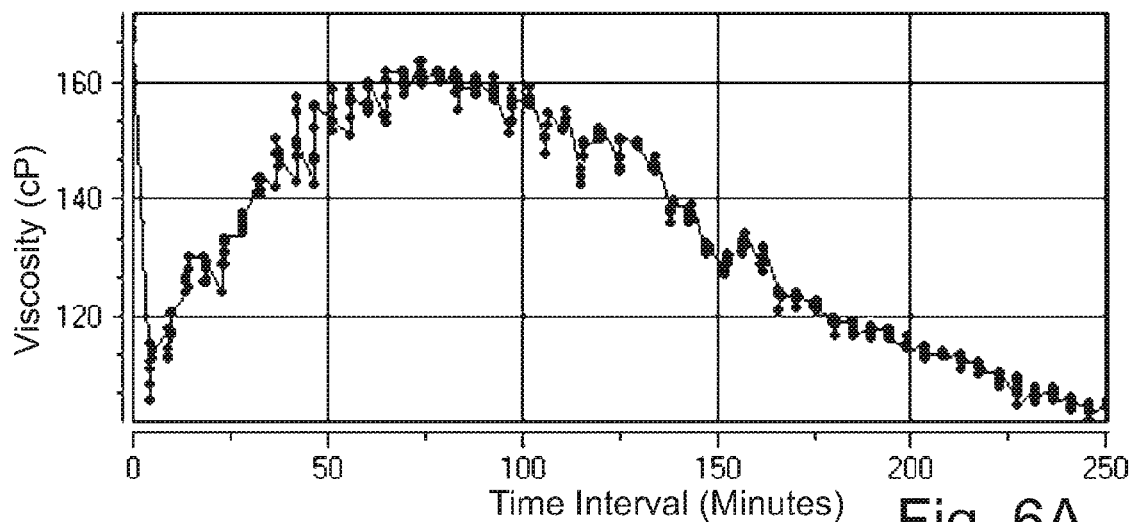
Figure 6B:
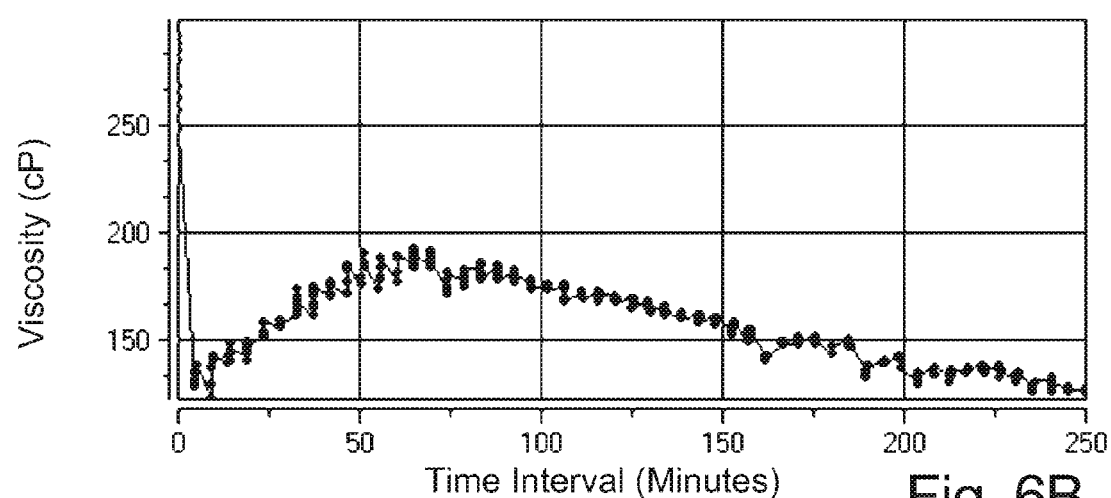
Figure 7A:
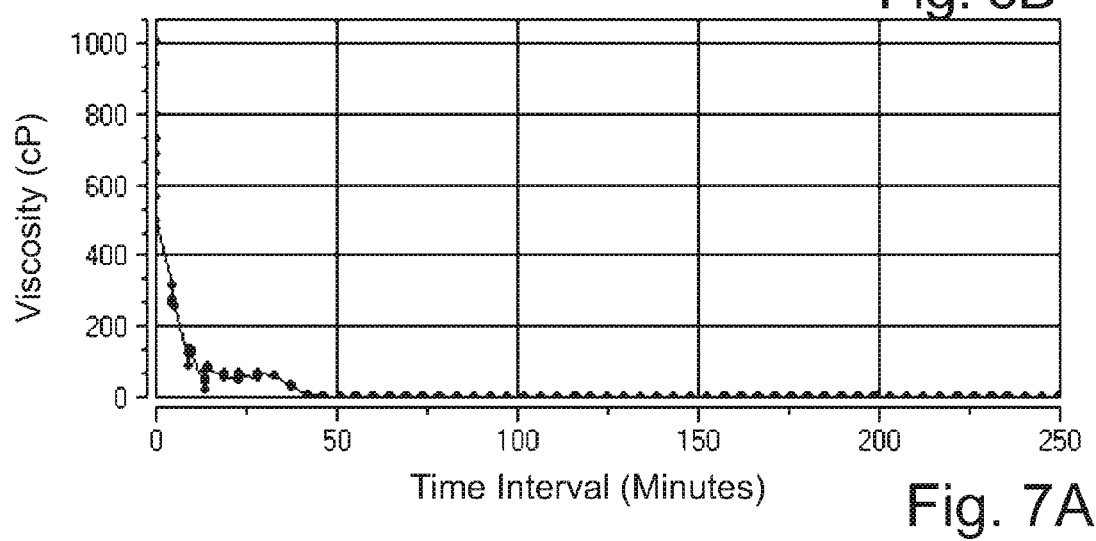
Figure 7B:
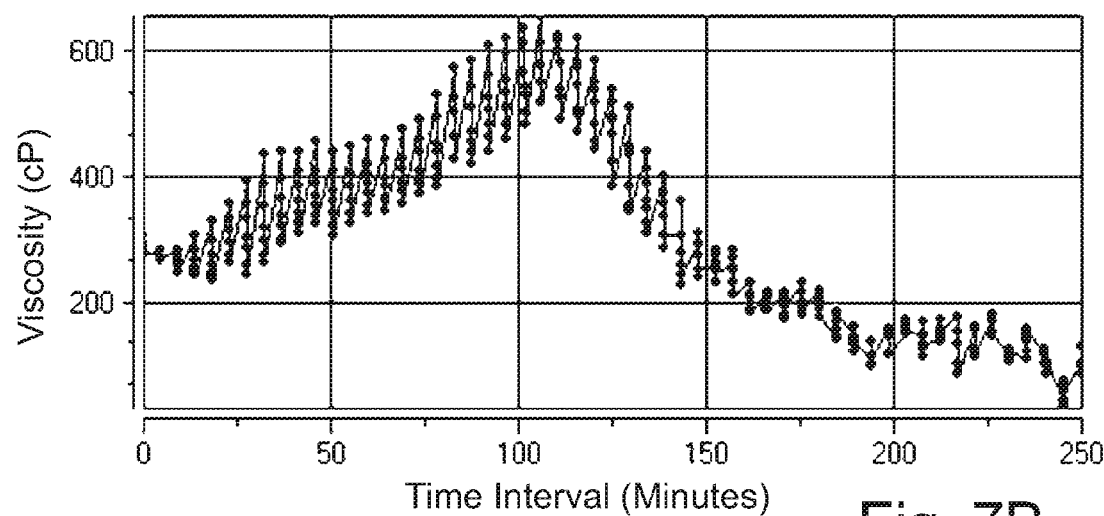
Figure 7C:
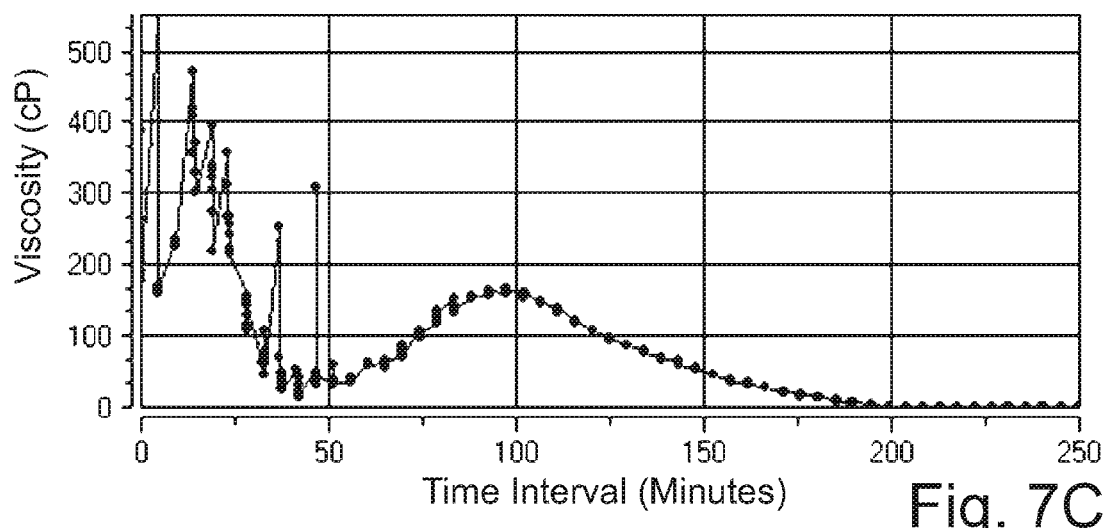
Figure 7D:
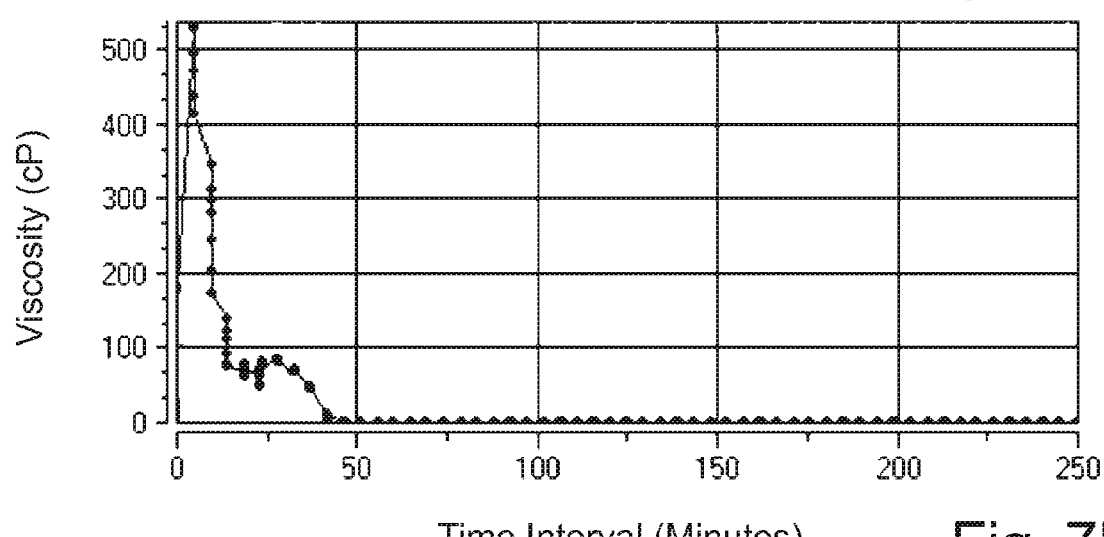
Figure 7E:
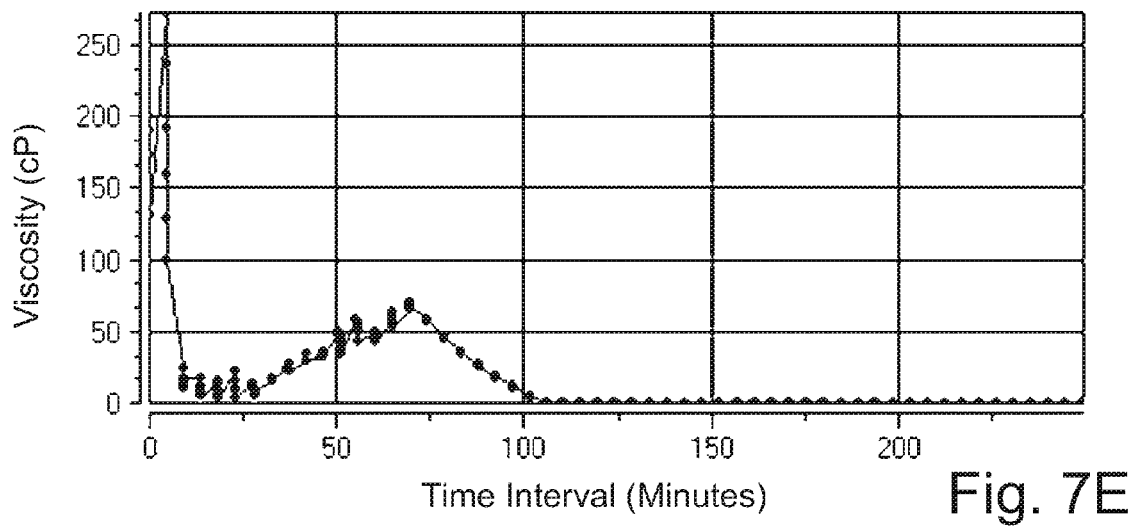
Figure 7F:
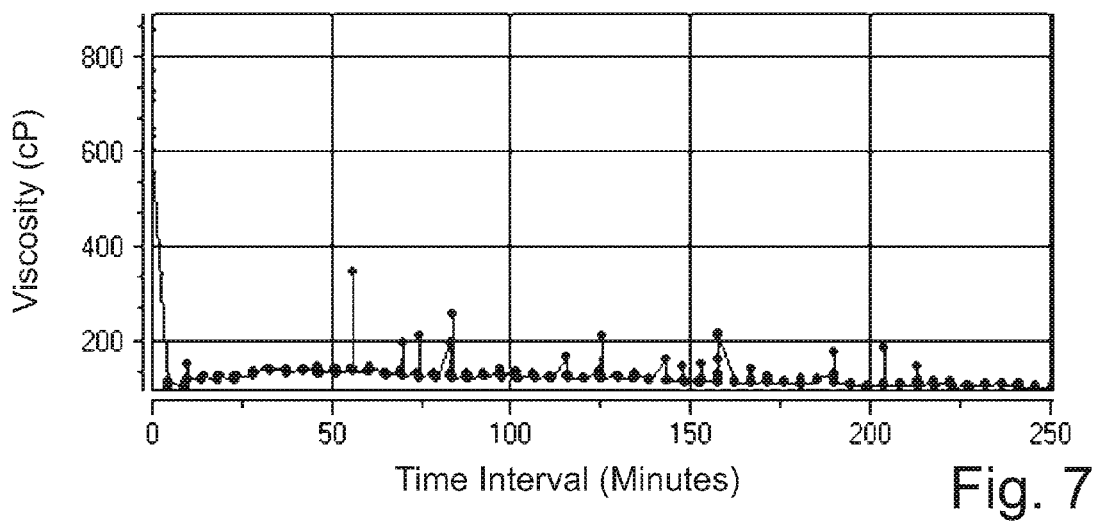
Figure 7G:
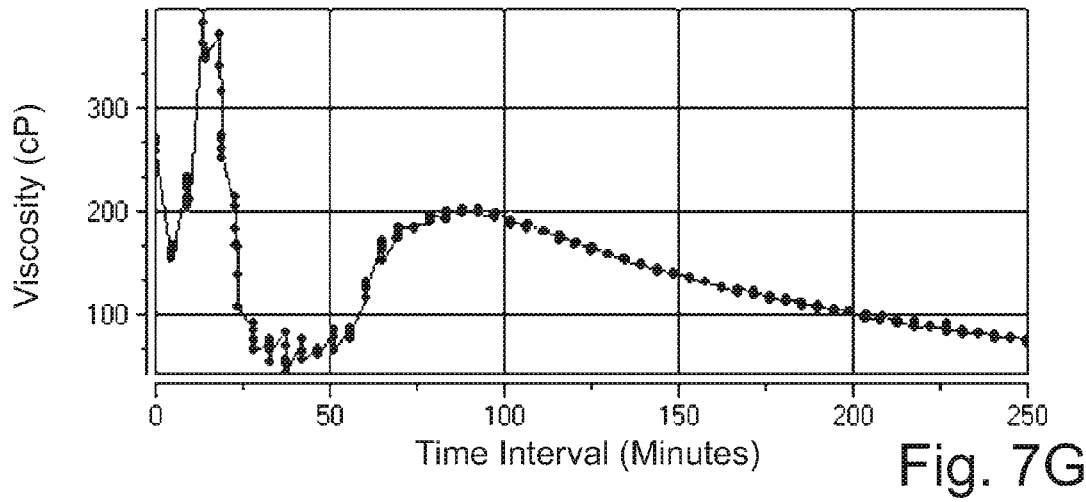
Figure 7H:
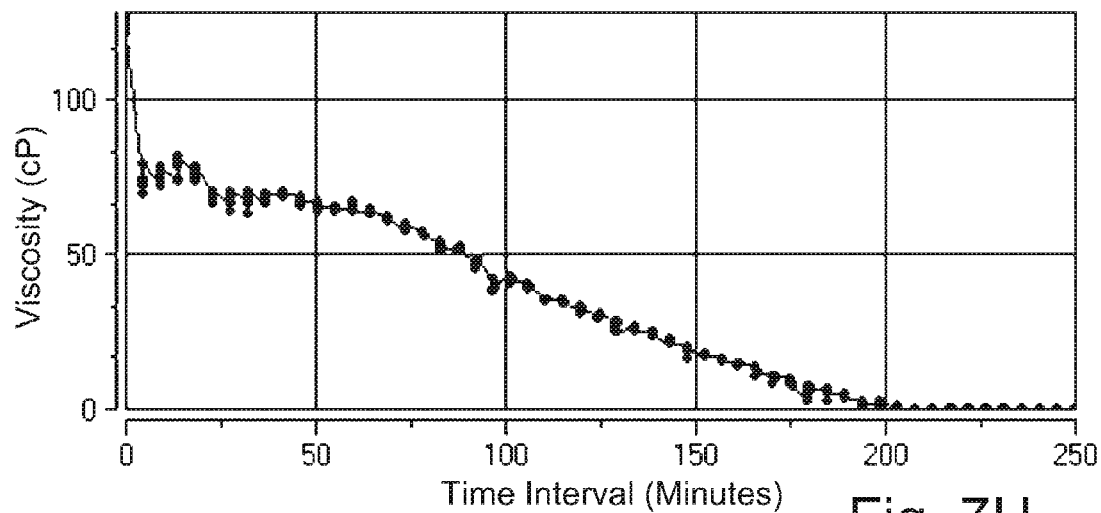
Figure 7I:
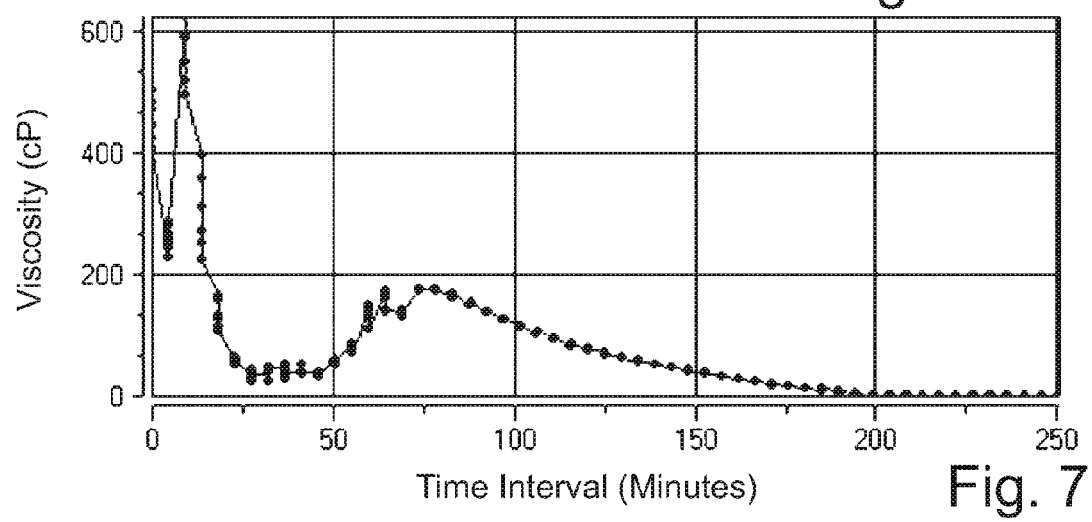
Figure 8A:
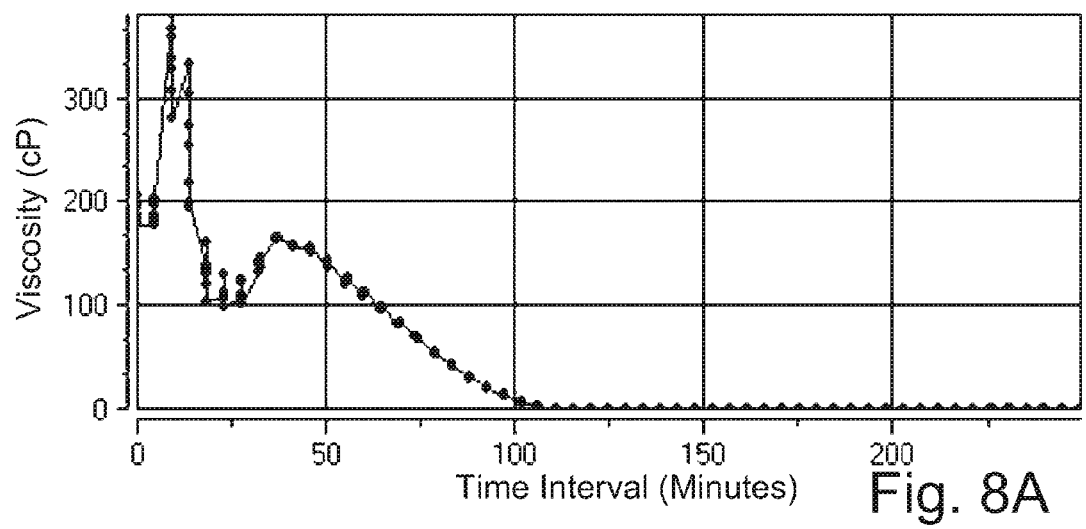
Figure 8B:
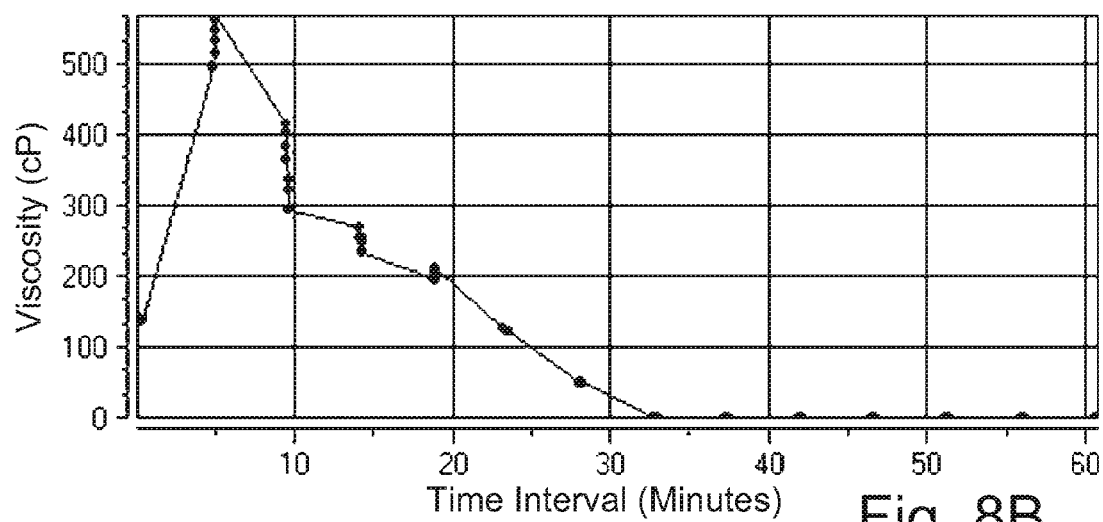
Figure 8C:
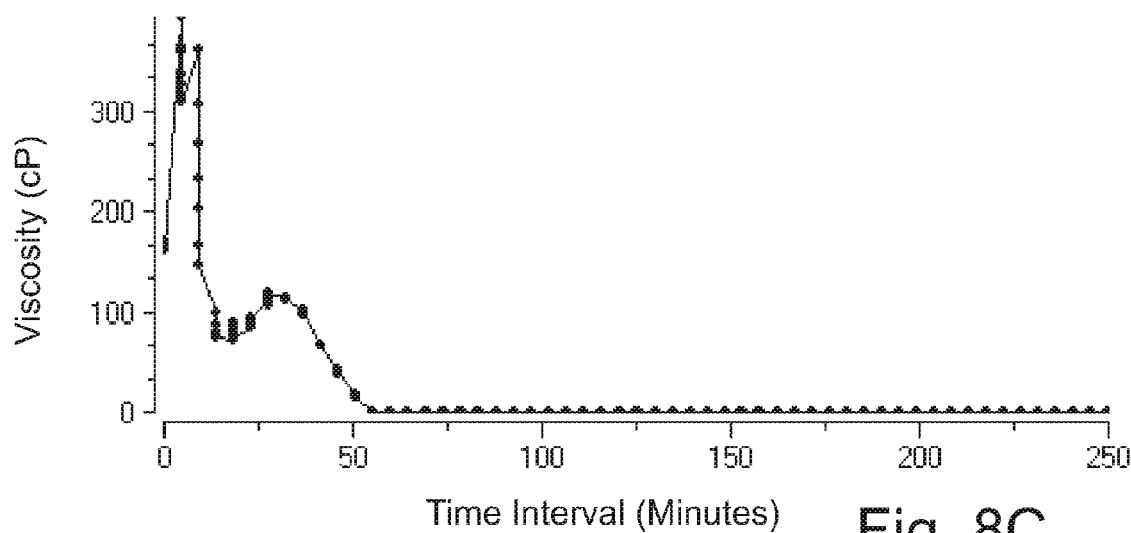
Figure 8D:
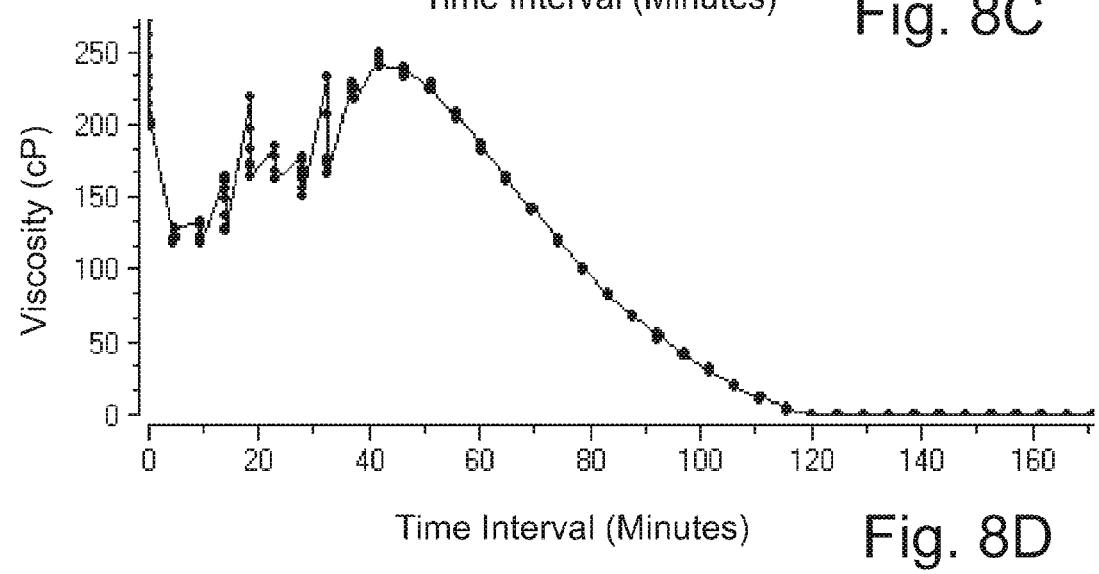
Figure 8E:
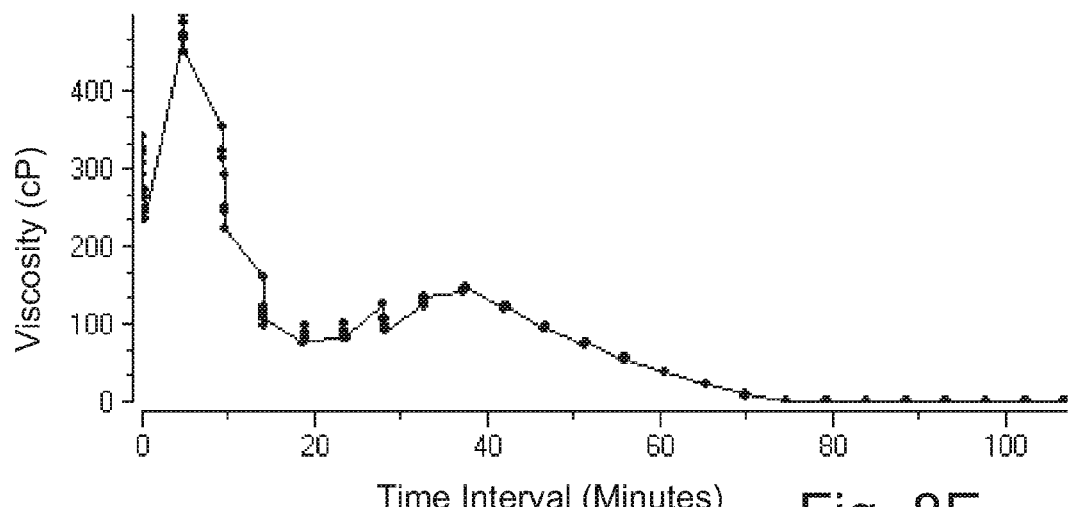
Figure 8F:
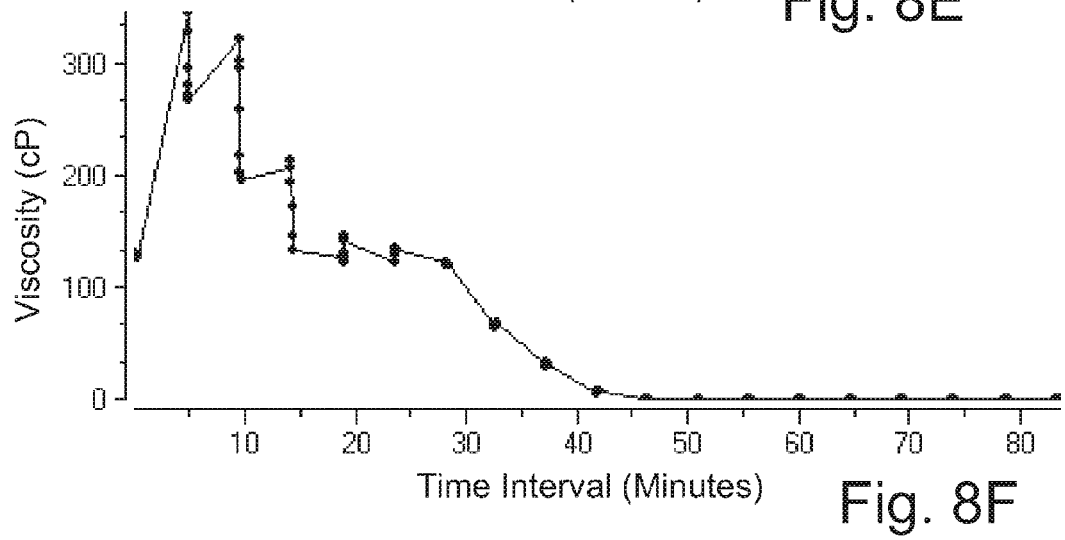
Figure 8G:
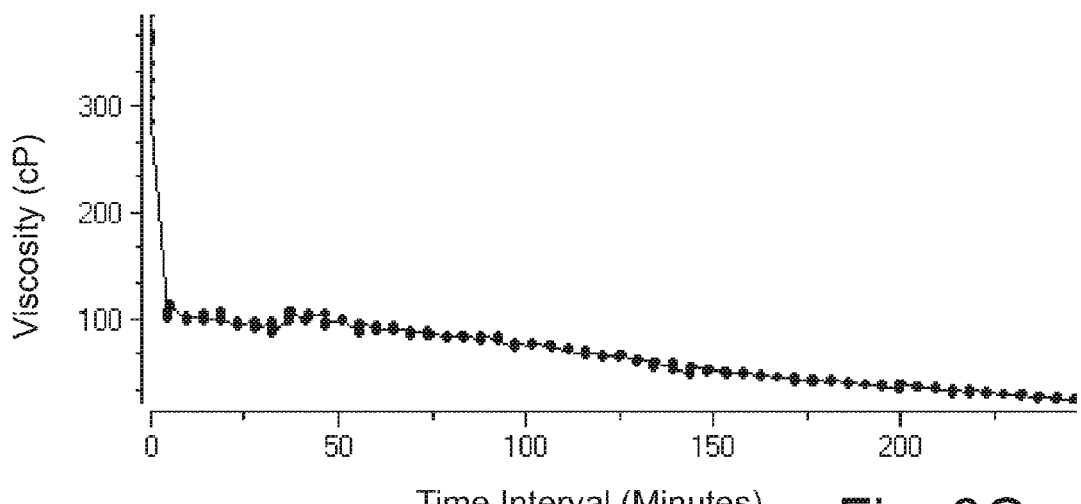
Figure 8H:
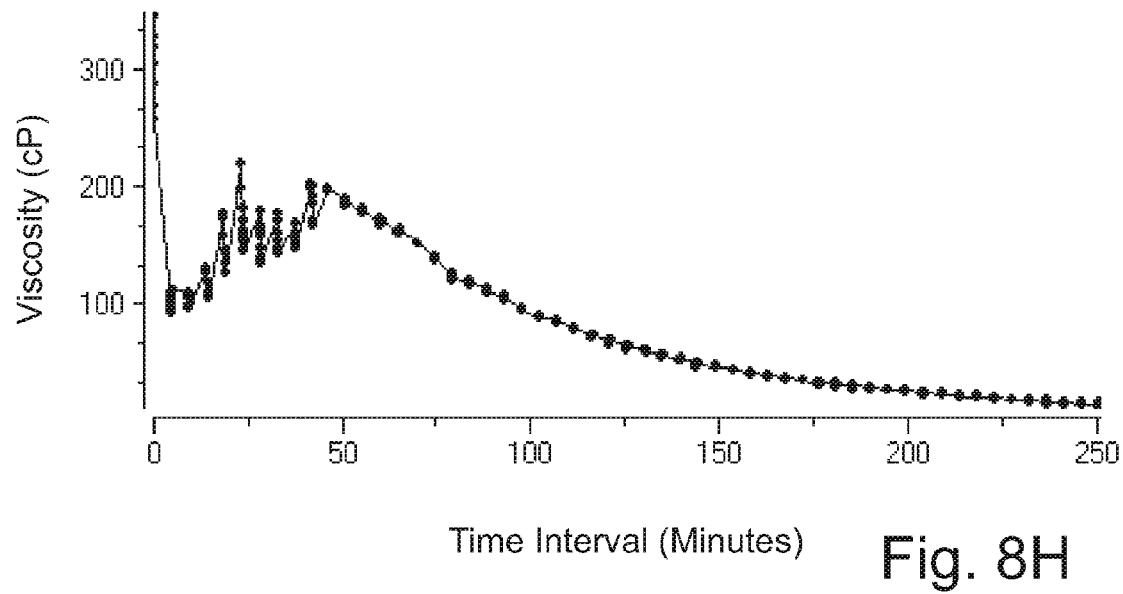
Figure 8I:
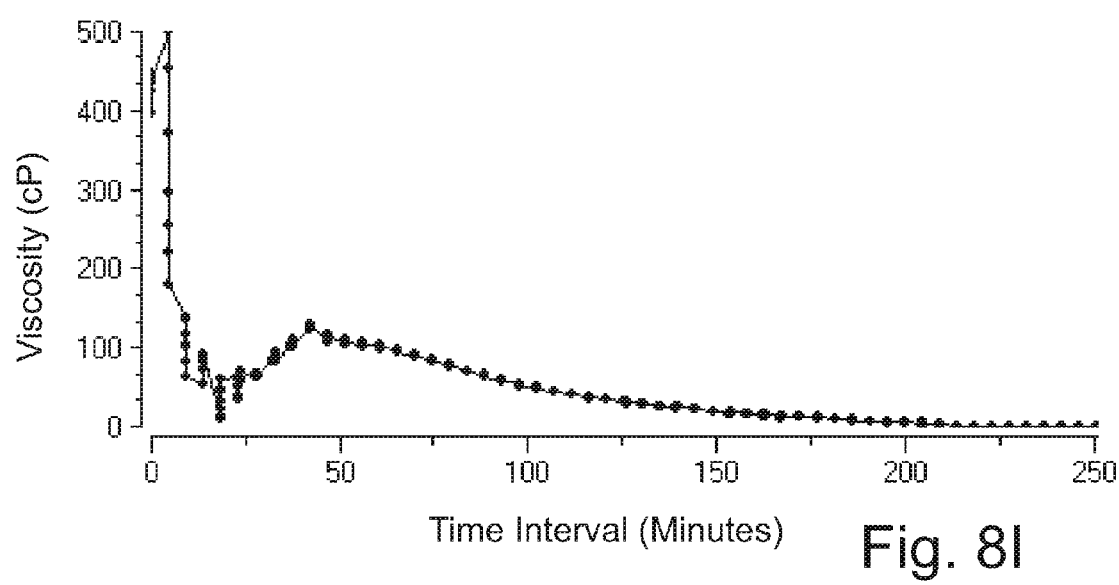
Figure 9A:
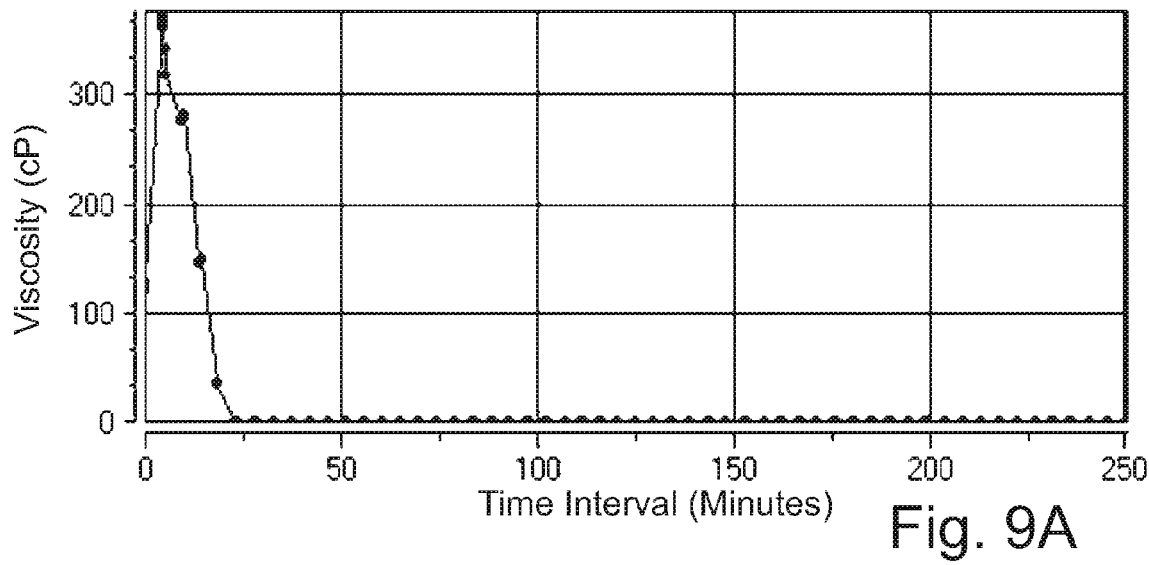
Figure 9B:
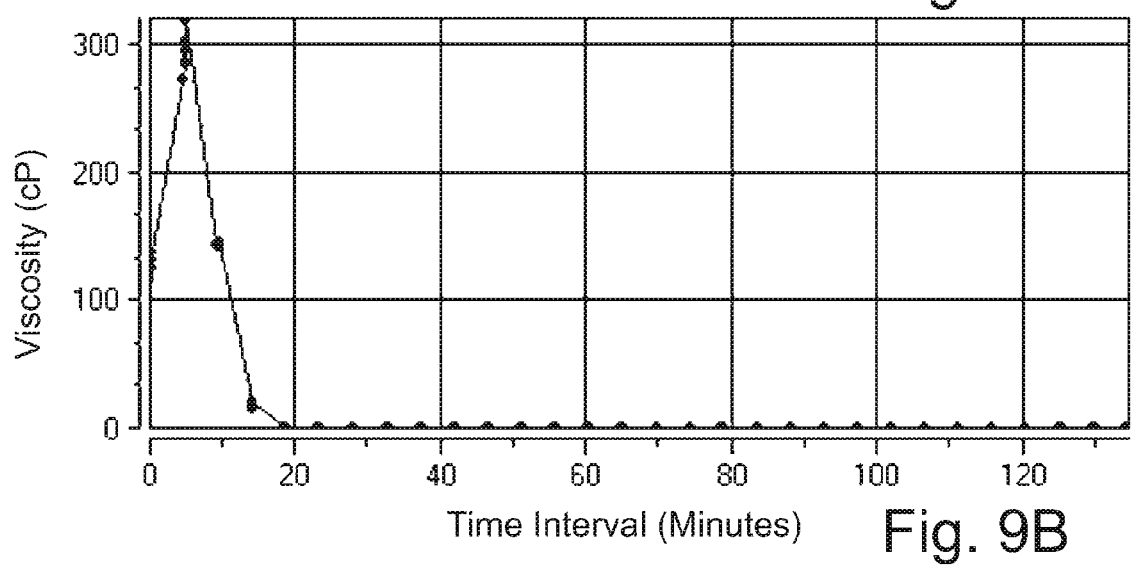
Figure 9C:
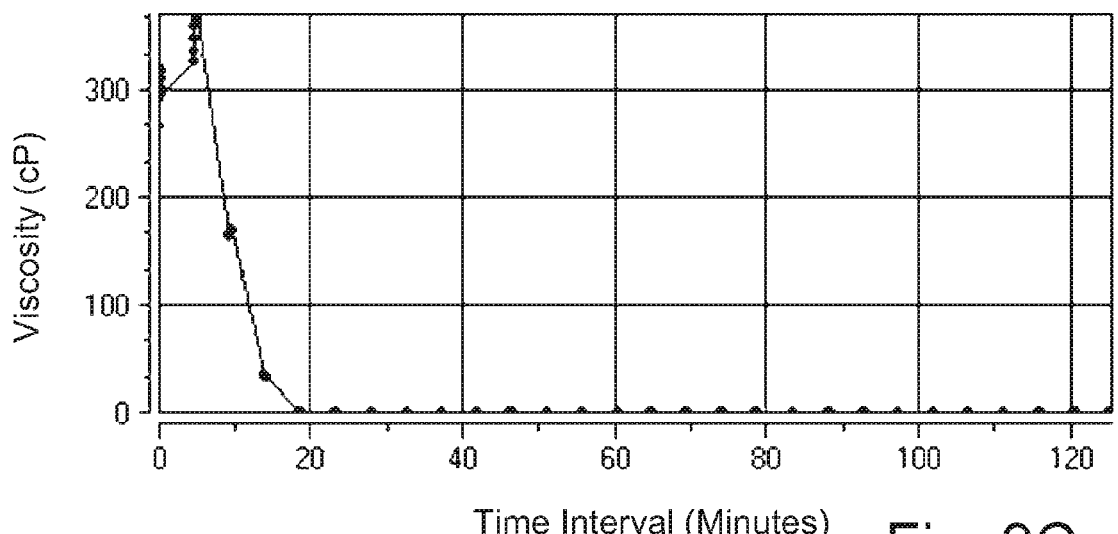
Figure 9D:
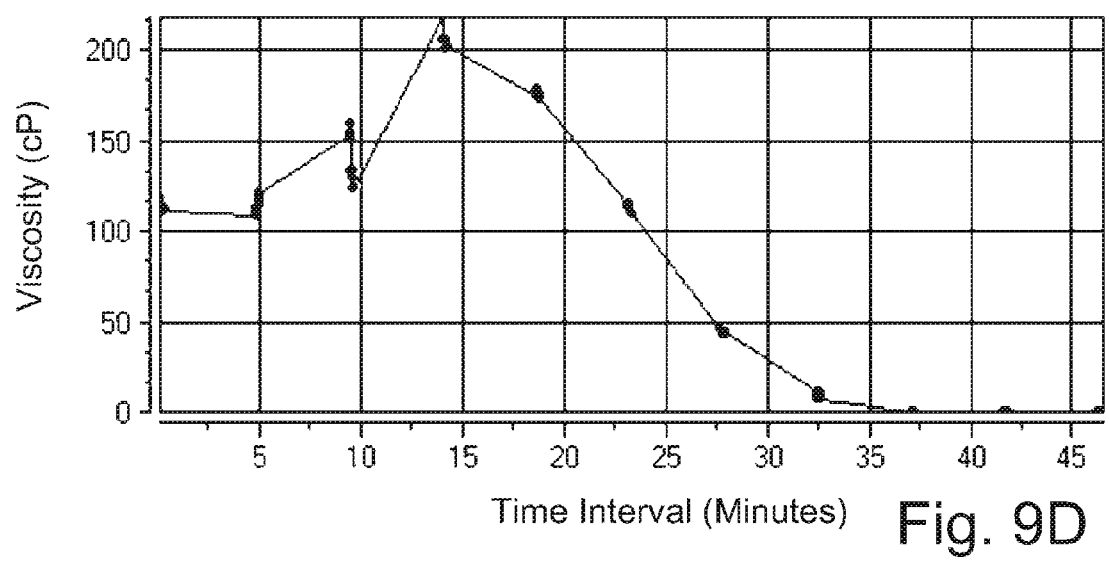
Figure 9E:
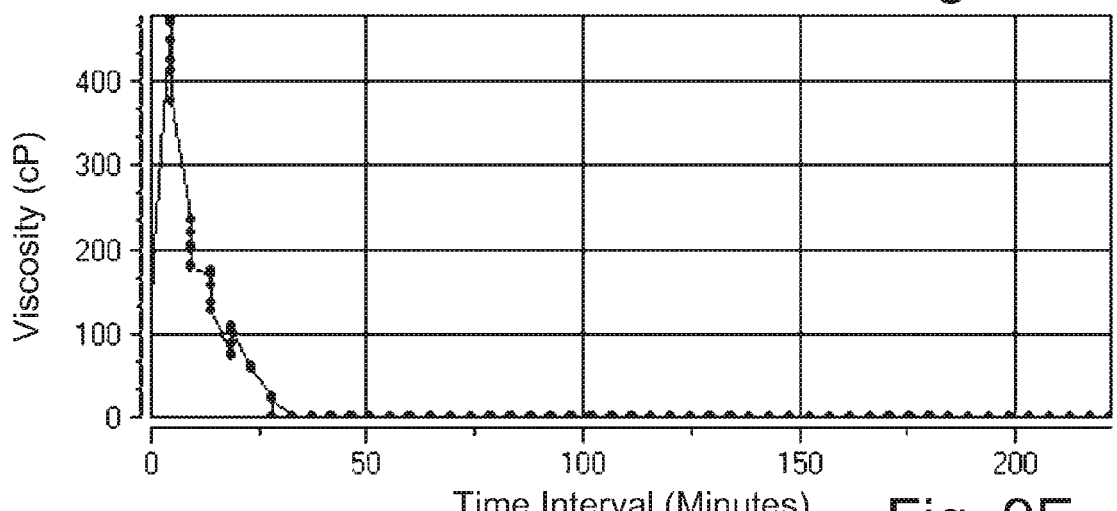
Figure 9F:
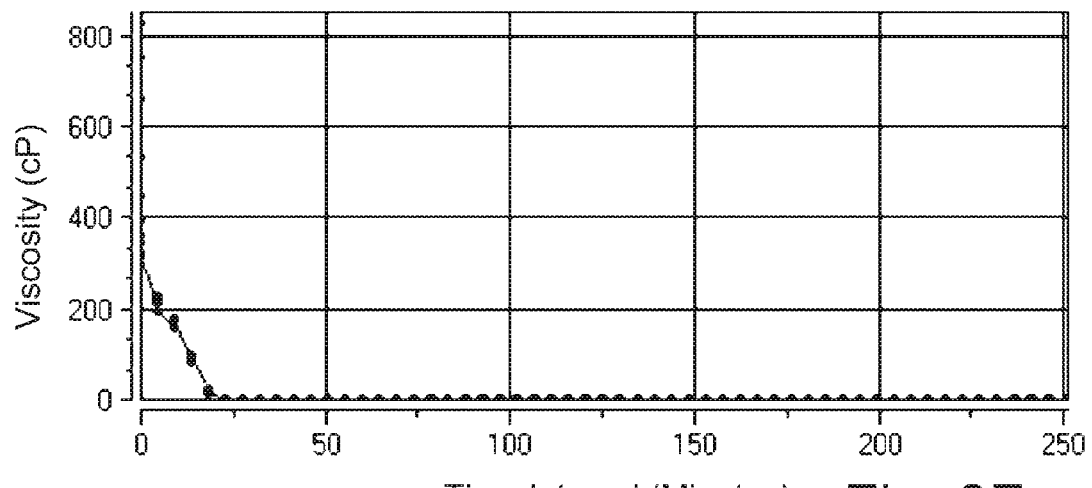
Figure 9G:
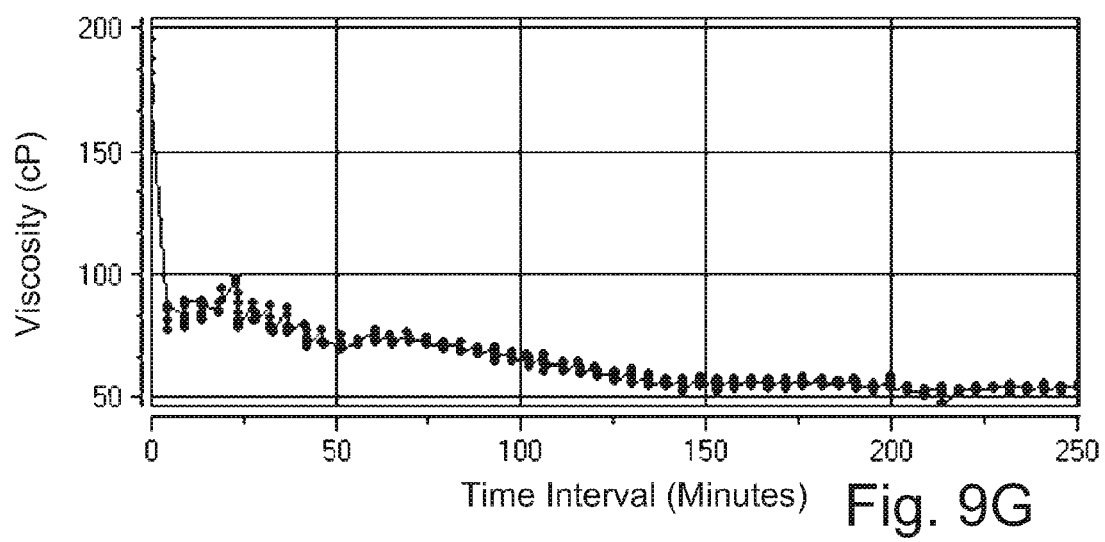
Figure 9H:
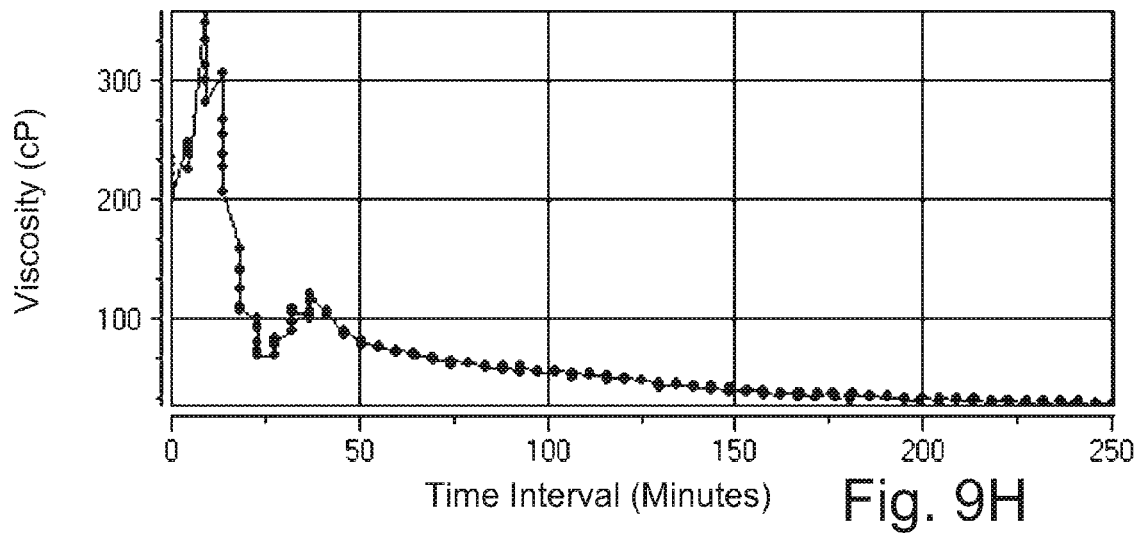
Figure 9I:
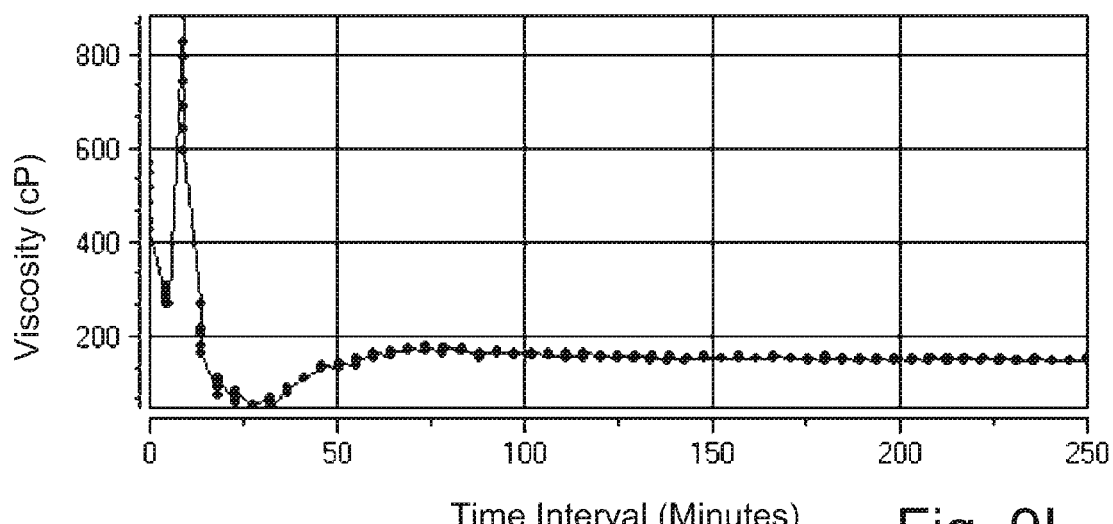
Figure 10A:
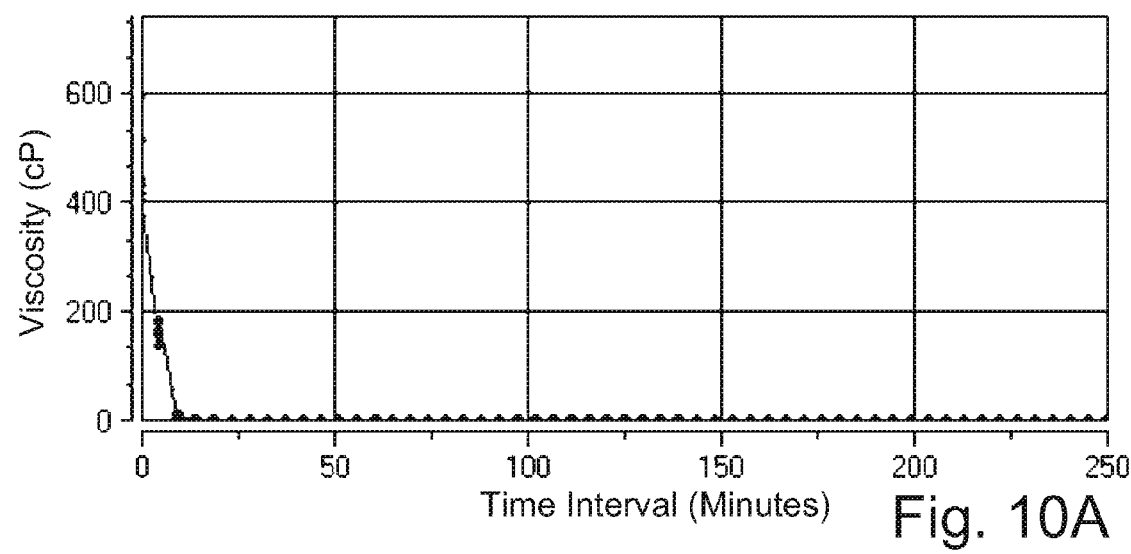
Figure 10B:
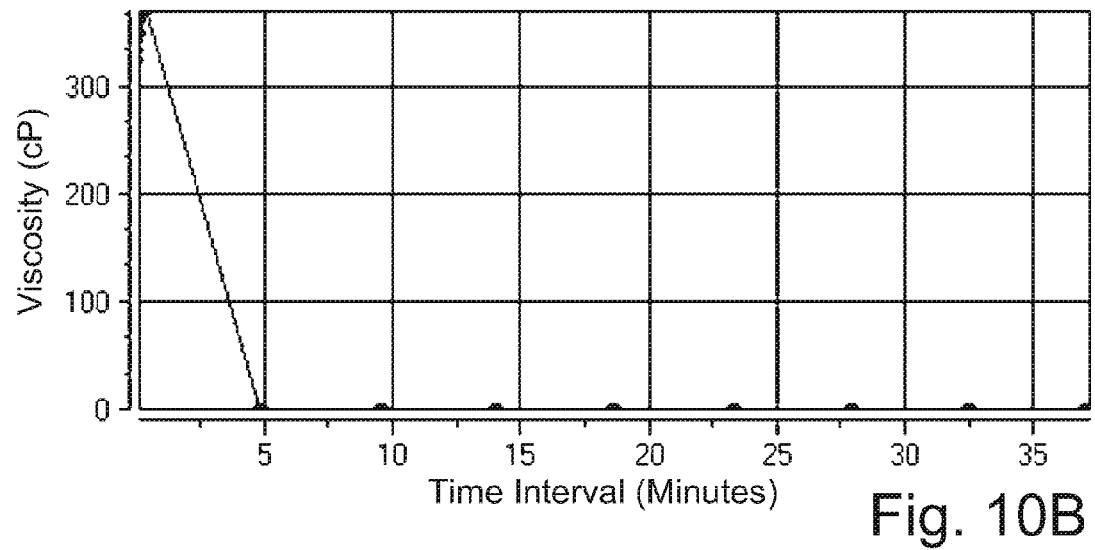
Figure 10C:
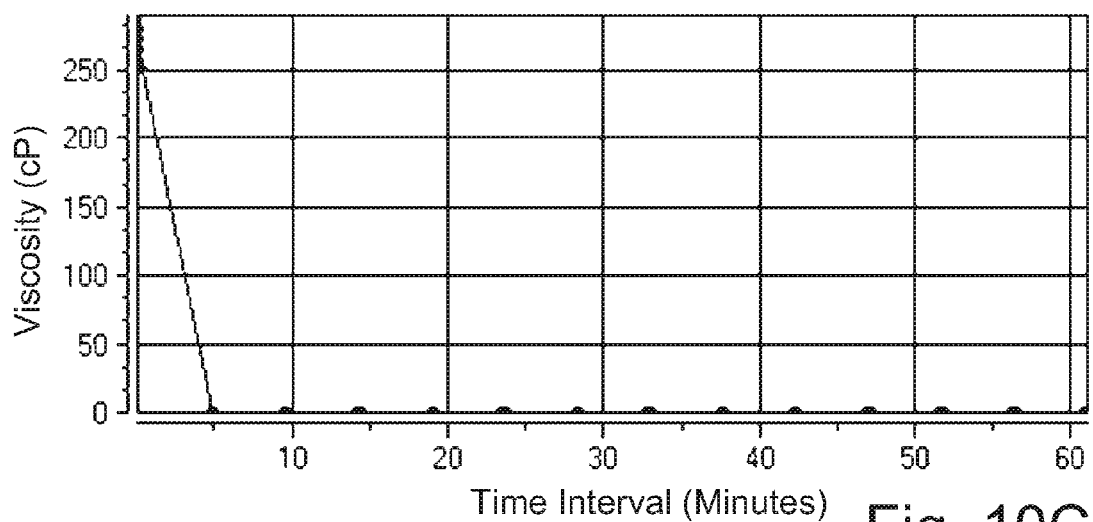
Figure 10D:
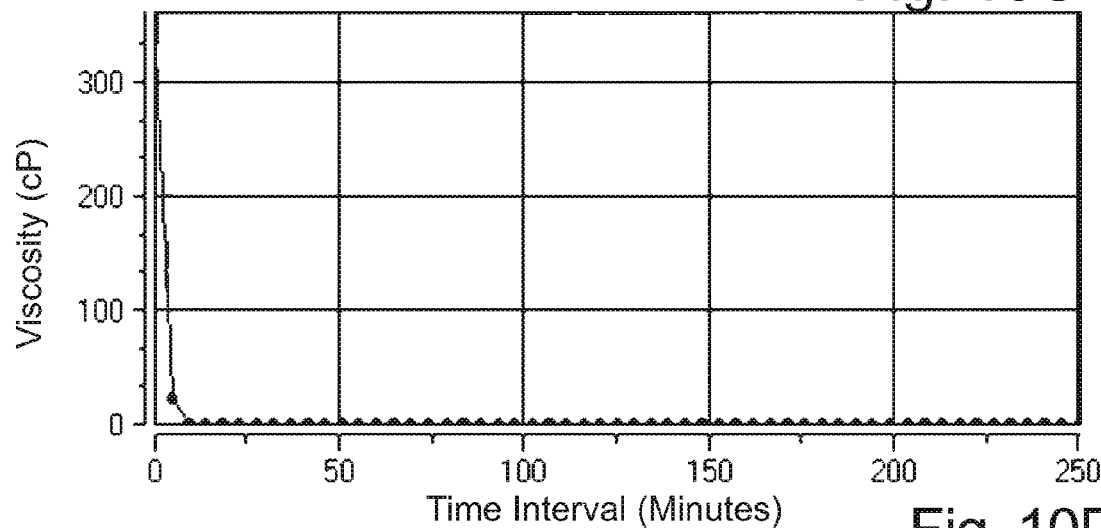
Figure 10E:
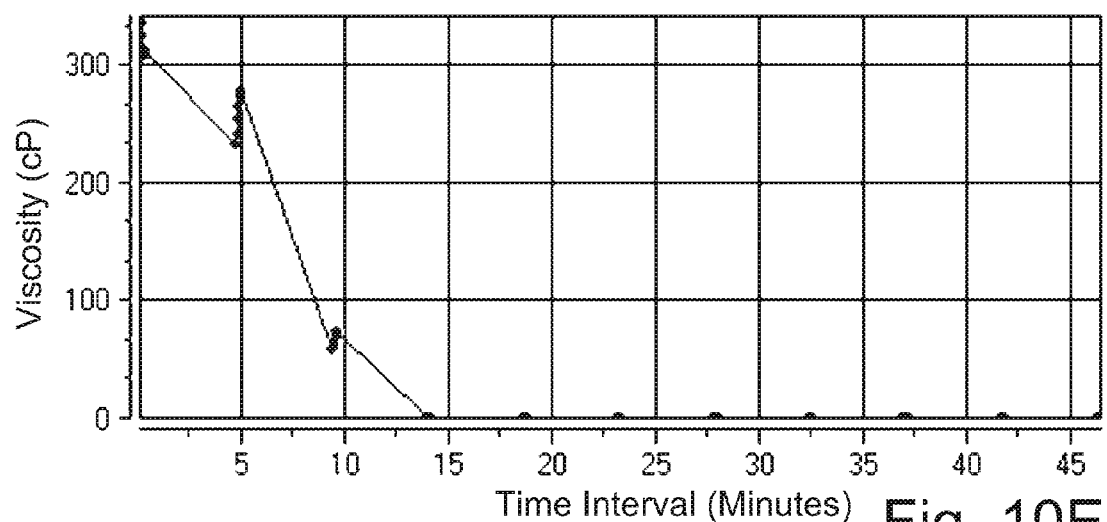
Figure 10F:
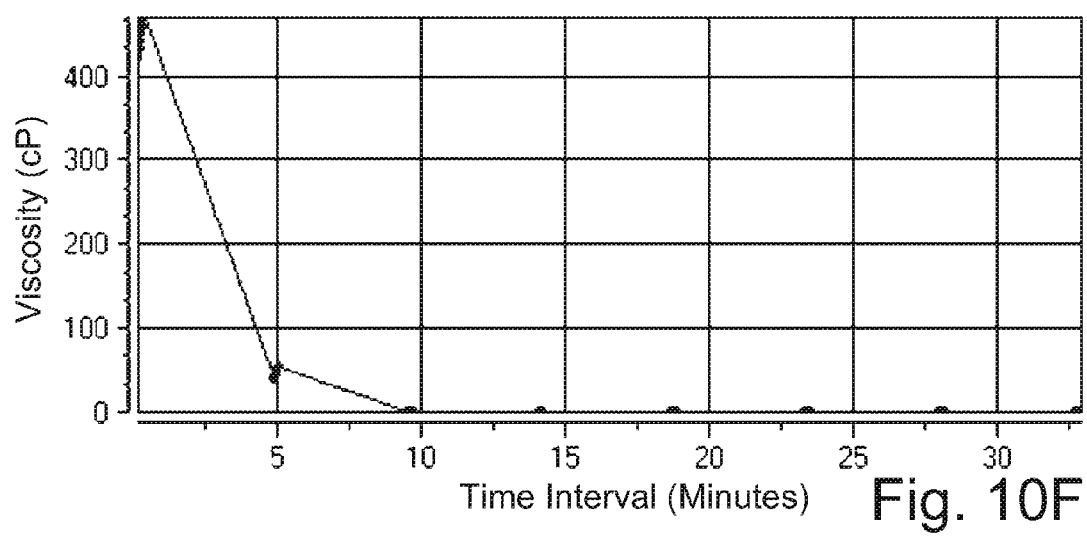
Figure 10G:
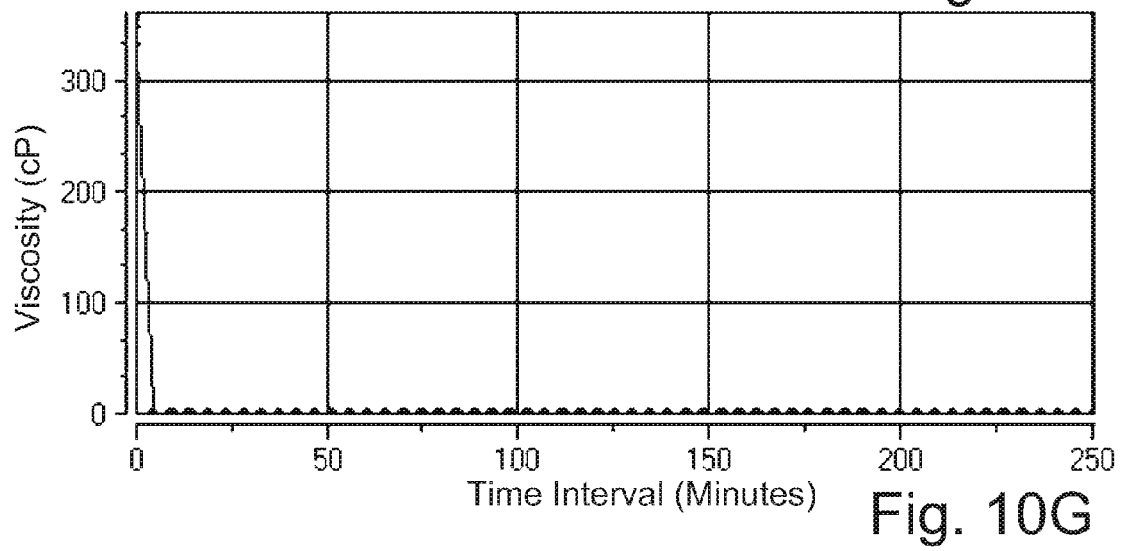
Figure 10H:
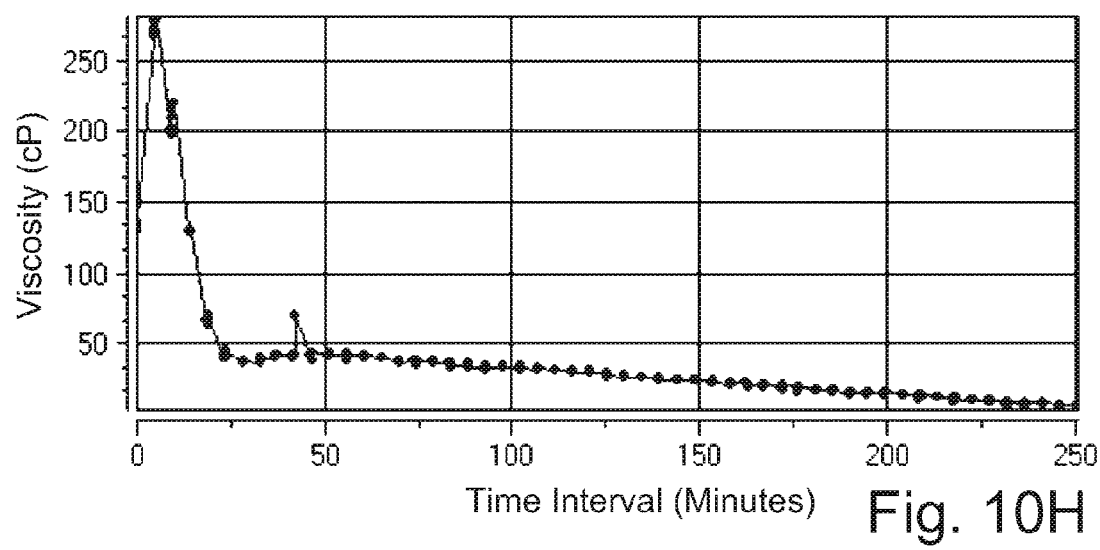
Figure 10I:
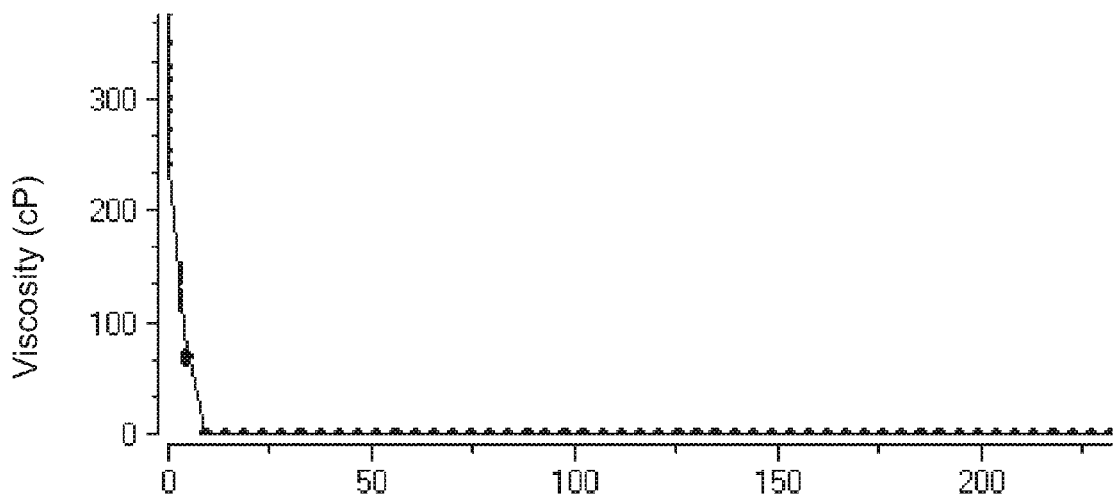
Figure 10J:
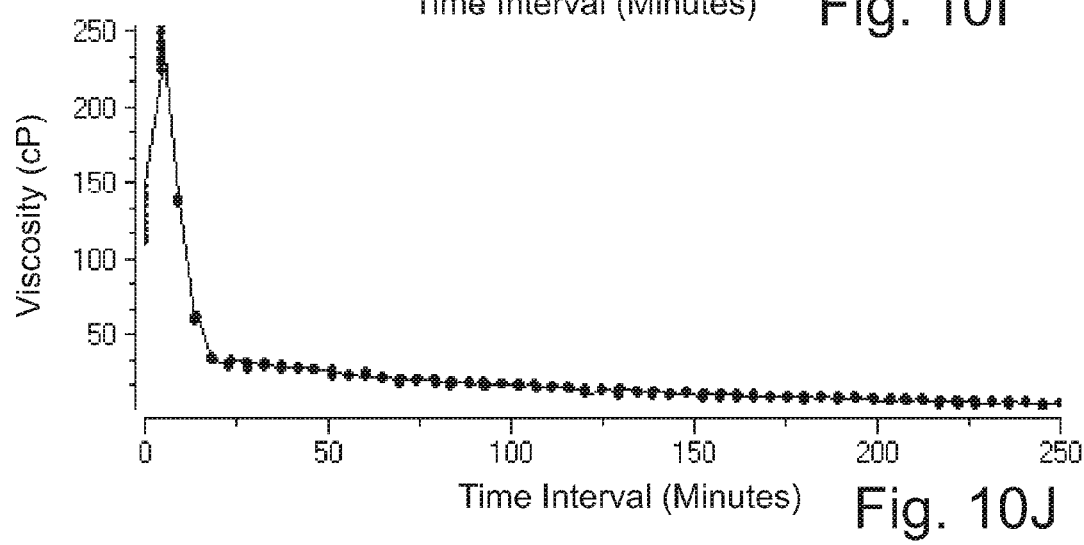
Figure 10K:
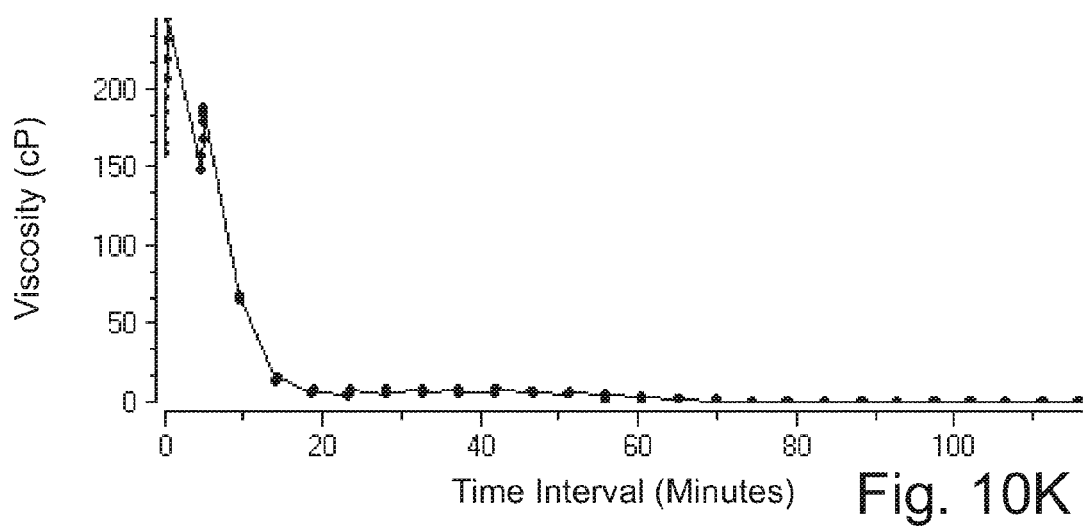

Referring to FIGS. 6A-6B, the following exemplary procedure was used to form the fracturing fluids tested. Similar procedures were used to form the other fracturing fluids tested and reported here. Butyl lithium (3.53 mL of a 1.7 M solution in pentane, 6 mmol) was added dropwise to a stirring solution of dodecanol (1.12 g, 6 mmol) in pentane (125.00 g, 1% by wt gelling agents in pentane). This mixture was then stirred for a further 1 h at room temperature. A separate solution of tributyl borate (1.62 mL, 6 mmol) in pentane (125.00 g) was prepared in a blender at 17% variance with a rheostat for 5 min. To this solution was added the lithium alkoxide solution and a hydrated breaker (see Table 1 for the breakers tested). In this case, the hydrated breaker was $CaSO_4(2H_2O)$ (2.91 g, 0.15% by vol. $H_2O$, 60 mesh) Blending was continued for 1 min at 30% variance. Over this time cloudy white gels formed. These were tested on a Brookfield viscometer—60° C., 4 h, 110 psi. Table 2 below illustrates the various amounts of the different types of breakers tested.

TABLE 2

Various amounts of breaker added to achieve desired concentrations

| Breaker introduced | Amount (g) | % of $H_2O$ |
|---|---|---|
| $Al_2(SO_4)_3(16H_2O)$ | 1.33 | 0.15 |
| $Al_2(SO_4)_3(16H_2O)$ | 0.90 | 0.10 |
| $Al_2(SO_4)_3(16H_2O)$ | 0.44 | 0.05 |
| $AlK(SO_4)_2(12H_2O)$ | 1.34 | 0.15 |
| $AlK(SO_4)_2(12H_2O)$ | 0.90 | 0.10 |
| $AlK(SO_4)_2(12H_2O)$ | 0.44 | 0.05 |
| $BaCl_2(2H_2O)$ | 4.41 | 0.15 |
| $BaCl_2(2H_2O)$ | 2.78 | 0.10 |
| $BaCl_2(2H_2O)$ | 1.36 | 0.05 |
| $CaCl_2(6H_2O)$ | 1.24 | 0.15 |
| $CaCl_2(6H_2O)$ | 0.83 | 0.10 |
| $CaCl_2(6H_2O)$ | 0.41 | 0.05 |
| $CaSO_4(2H_2O)$ | 2.91 | 0.15 |
| $CaSO_4(2H_2O)$ | 1.96 | 0.10 |
| $CaSO_4(2H_2O)$ | 0.96 | 0.05 |
| $MgCl_2(6H_2O)$ | 1.15 | 0.15 |
| $MgSO_4(7H_2O)$ | 1.19 | 0.15 |
| $MgSO_4(7H_2O)$ | 0.80 | 0.10 |
| $MgSO_4(7H_2O)$ | 0.39 | 0.05 |
| $ZnSO_4(7H_2O)$ | 1.39 | 0.15 |
| $ZnSO_4(7H_2O)$ | 0.93 | 0.10 |
| $ZnSO_4(7H_2O)$ | 0.46 | 0.05 |
| $Na_2SO_4(10H_2O)$ | 1.09 | 0.15 |
| $Na_2SO_4(10H_2O)$ | 0.73 | 0.10 |
| $Na_2SO_4(10H_2O)$ | 0.36 | 0.05 |

Referring to FIG. 1, the following exemplary procedure was used to form the gelled hydrocarbon fracturing fluid as a control without a breaker chemical. Butyl lithium (1.76 ml, of a 1.7 M solution in pentane, 3 mmol) was added dropwise to a stirring solution of alcohol (C4, C5, C6, C8, C10, C12, C14, C16, and C18 primary alcohols were tested successfully, but only the test results using dodecanol (C12) are displayed here, 3 mmol) in pentane (½ pre-weighed mass for 1% by weight). This mixture was then stirred for a further 1 h at room temperature. The remaining pentane was then added and stirring continued for 10 min. A solution of tributyl borate (0.69 g, 3 mmol) in pentane (1% by wt) was prepared as the trialkoxide with stirring for 10 min. The two solutions were then combined with stirring for 10 min over which time a colourless soft gel formed. This was then left to stand for 10 min before being tested on a Brookfield viscometer—23° C., 4 h, 110 psi. The tested gels were shear-thinning Based on successful testing results with C4, C5, C6, C8, C10, C12, C14, C16, and C18 lithium alkoxides, the C12 lithium alkoxide was chosen as the best candidate to perform the testing reported here with the tributyl borate to form the charged borate gelling chemical.

Referring to FIG. 11, a method of treating a downhole environment is illustrated. In stage 10, a gelling agent and a hydrated breaker, such as the gelling agents and hydrated breakers discussed above, are added to a fracturing fluid to produce a water-sensitive gel. In stage 12, an underground formation is treated, for example fractured, with the water-sensitive gel. The fracturing fluid may be pressurized in the formation, for example in order to fracture the formation. Fracturing procedures are well known and need not be elaborated upon herein. The hydrated breaker may be selected to release water at a delayed rate while treating the underground formation. For example, fluid in the formation may have a temperature of 80° C., and a hydrated ionic salt breaker may be selected to release water at a desired rate at that temperature. The desired rate may be selected based on the desired break time, for example 4 hours. Thus, the hydrate may act as a hydrating agent for degrading or destroying the gel.

Referring to FIG. 12, a method of treating a downhole environment with a fracturing fluid is disclosed. In a stage 14, the downhole environment has provided to it a fluid comprising a water-sensitive carrier, such as a hydrophobic medium, and a breaker, the breaker comprising one or more hydrates. The one or more hydrates may be configured to release water over one or both of a particular period of time and a particular range of temperature. The water-sensitive carrier may be formed from a fluid and one or more gelling agent. In a stage 16, water from the one or more hydrates is allowed to release so as to act with the carrier to reduce the viscosity of the fluid. In a subsequent stage, the fluid of reduced viscosity is removed from the downhole environment. The fluid may then undergo processing, recycling, disposal, burn-off, or re-use.

It should be understood that various embodiments disclosed herein may be used in various other embodiments disclosed herein as desired. In some embodiments, the hydrate is added to the fracturing fluid while the fracturing fluid is downhole. The hydrate used may be a mixture of one or more hydrates.

In some embodiments, it may be desired to have a fracturing fluid with a sufficient viscosity to carry proppant into the fractures, minimize formation damage and be safe to use. A fracturing fluid that remains in the formation after fracturing may not be desirable since it may block pores and reduce well production. Liquefied petroleum gas makes an excellent fracturing fluid that achieves all of the above-indicated desired functions.

The breakers and gelling agents disclosed herein make suitable gelled liquefied petroleum gas (LPG) fracturing fluids. In addition to the pentane tests disclosed in the Figures, propane and butane have also been successfully tested. LPG may include a variety of petroleum and natural gases existing in a liquid state at ambient temperatures and moderate pressures. In some cases, LPG refers to a mixture of such fluids. These mixes are generally more affordable and easier to obtain than any one individual LPG, since they are hard to separate and purify individually. Unlike conventional hydrocarbon based fracturing fluids, common LPGs are tightly fractionated products resulting in a high degree of purity and very predictable performance. Exemplary LPGs used in this document include, propane, butane, and various mixes thereof. Further examples include HD-5 propane, commercial butane, i-butane, and n-butane. LPGs used herein may include amounts of pentane, hexane, i-pentane, n-pentane, and other higher weight hydrocarbons. The LPG mixture may be controlled to gain the desired hydraulic fracturing and clean-up performance.

LPGs tend to produce excellent fracturing fluids. LPG is readily available, cost effective and is easily and safely handled on surface as a liquid under moderate pressure. LPG is completely compatible with formations and formation fluids, is highly soluble in formation hydrocarbons and eliminates phase trapping—resulting in increased well production. LPG may be readily and predictably viscosified to generate a fluid capable of efficient fracture creation and excellent proppant transport. After fracturing, LPG may be recovered very rapidly, allowing savings on clean up costs. In some embodiments, LPG may be predominantly propane, butane, or a mixture of propane and butane. Predominantly may mean for example over 80%, for example over 90 or 95%.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of treating a downhole environment, the method comprising:
  adding a gelling agent and a hydrated breaker to a fracturing fluid to produce a water-sensitive gel, the hydrated breaker being in solid form and having a crystalline framework containing water that is bound within the crystalline framework prior to addition to the fracturing fluid and releasable into the fracturing fluid to act on the water-sensitive gel to reduce the viscosity of the fracturing fluid; and treating a downhole environment with the water-sensitive gel, in which the hydrated breaker is selected to release water bound within the crystalline framework at a delayed rate while treating the downhole environment.

2. A method of treating a downhole environment with a fracturing fluid, the method comprising:
  adding to a fracturing fluid a water-sensitive carrier and a breaker, the breaker being in solid form and comprising one or more hydrates prior to addition to the fluid;
  providing to the downhole environment the fluid and allowing water from the one or more hydrates to release at a delayed rate while treating the downhole environment so as to act with the carrier to reduce the viscosity of the fluid.

3. The method according to claim 2, comprising removing from the downhole environment the fluid of reduced viscosity.

* * * * *